United States Patent
Galka

(10) Patent No.: US 12,141,808 B2
(45) Date of Patent: Nov. 12, 2024

(54) SYSTEMS AND METHODS FOR QUANTIFYING AND ELECTRONICALLY DISPLAYING DEGREES OF ASSOCIATION BETWEEN BLOCKCHAIN ADDRESSES

(71) Applicant: Elementus Inc., New York, NY (US)

(72) Inventor: Maxwell David Galka, New York, NY (US)

(73) Assignee: Elementus Inc., New York, NY (US)

(*) Notice: Subject to any disclaimer, the term of this patent is extended or adjusted under 35 U.S.C. 154(b) by 0 days.

(21) Appl. No.: 17/805,055

(22) Filed: Jun. 2, 2022

(65) Prior Publication Data

US 2022/0292507 A1 Sep. 15, 2022

Related U.S. Application Data

(62) Division of application No. 17/340,433, filed on Jun. 7, 2021, now Pat. No. 11,379,844.

(Continued)

(51) Int. Cl.
*G06Q 20/40* (2012.01)
*G06F 16/901* (2019.01)
(Continued)

(52) U.S. Cl.
CPC ..... *G06Q 20/4016* (2013.01); *G06F 16/9024* (2019.01); *G06Q 20/065* (2013.01); *G06Q 20/389* (2013.01); *G06Q 2220/00* (2013.01)

(58) Field of Classification Search
CPC .............. G06F 16/9024; G06Q 20/065; G06Q 20/389; G06Q 2220/00; G06Q 20/4016

(Continued)

(56) References Cited

U.S. PATENT DOCUMENTS 10,693,872 B1 6/2020 Larson et al.
2012/0182865 A1* 7/2012 Andersen et al.
(Continued)

FOREIGN PATENT DOCUMENTS

EP 3550464 A1 10/2019
KR 10-2074074 B1 2/2020
(Continued)

OTHER PUBLICATIONS

National Archives and Records Administration, "Blockchain White Paper", Feb. 2019, 20 pp., <https://www.archives.gov/files/records-mgmt/policy/nara-blockchain-whitepaper.pdf>.

(Continued)

*Primary Examiner* — Neha Patel
*Assistant Examiner* — Yin Y Choi
(74) *Attorney, Agent, or Firm* — Bookoff McAndrews, PLLC

(57) ABSTRACT

Disclosed are methods and systems for quantifying degrees of association between blockchain addresses in a weighted-linked database. The method may include: obtaining a node data set comprising one or more nodes and edges; associating a first node of the node data set with a first weight factor; identifying a first edge of the node data set, wherein the first edge comprises data indicating a source node address corresponding to the first node, a target node address corresponding to a second node of the one or more nodes in the node data set, and a first edge weight; determining a source value for the second node based on the first weight factor and the first edge weight; generating, a risk value for the second node based on the source value; and presenting, on a GUI, graphical depictions of the first node, the second node, and the first edge.

20 Claims, 19 Drawing Sheets

Related U.S. Application Data

(60) Provisional application No. 63/119,718, filed on Dec. 1, 2020, provisional application No. 62/705,000, filed on Jun. 5, 2020.

(51) Int. Cl.
*G06Q 20/06* (2012.01)
*G06Q 20/38* (2012.01)

(58) Field of Classification Search
USPC .......................................................... 705/64
See application file for complete search history.

(56) References Cited

U.S. PATENT DOCUMENTS

| | | |
|---|---|---|
| 2018/0316665 A1 | 11/2018 | Caldera et al. |
| 2018/0331832 A1* | 11/2018 | Pulsifer |
| 2019/0172067 A1 | 6/2019 | Arora et al. |
| 2019/0229892 A1 | 7/2019 | Jevans |
| 2019/0354962 A1 | 11/2019 | Spector |
| 2019/0361992 A1 | 11/2019 | Kaguma et al. |
| 2019/0370797 A1 | 12/2019 | Jevans et al. |
| 2019/0386969 A1 | 12/2019 | Verzun et al. |
| 2020/0057994 A1* | 2/2020 | Hunn et al. |
| 2020/0111066 A1 | 4/2020 | Anstey et al. |
| 2020/0160344 A1 | 5/2020 | Jevans et al. |
| 2020/0162485 A1 | 5/2020 | Jevans et al. |
| 2021/0112087 A1* | 4/2021 | Tassoumt et al. |

FOREIGN PATENT DOCUMENTS

| | | |
|---|---|---|
| WO | 2020/014399 A1 | 1/2020 |
| WO | 2020/061105 A1 | 3/2020 |
| WO | WO2020065242 A1 * | 4/2020 |
| WO | 2020/132246 A1 | 6/2020 |
| WO | 2020/149790 A1 | 7/2020 |

OTHER PUBLICATIONS

Chen et al., "A Survey of Blockchain Application in Different Domains", International Conference on Blockchain Technology and Applications (ICBTA) 2018 (Dec. 10-12, 2018), pp. 17-21, 5 pp., Xi'an, China (DOI: <https://doi.org/10.1145/3301403.3301407>.
International Search Report and Written Opinion mailed Sep. 8, 2021 in International Application No. PCT/US2021/36126 (11 pages).

* cited by examiner

FIG. 5

SYSTEMS AND METHODS FOR QUANTIFYING AND ELECTRONICALLY DISPLAYING DEGREES OF ASSOCIATION BETWEEN BLOCKCHAIN ADDRESSES

CROSS-REFERENCE TO RELATED APPLICATION(S)

This patent application is a divisional of and claims the benefit of priority to U.S. application Ser. No. 17/340,433, filed Jun. 7, 2021, which claims the benefit of priority to provisional Patent Application Nos. 62/705,000, filed on Jun. 5, 2020, and 63/119,718, filed on Dec. 1, 2020, the entireties of which are each incorporated herein by reference.

TECHNICAL FIELD

Various embodiments of the present disclosure generally relate to blockchain node transaction analytics, and more particularly, to systems and methods for quantifying and displaying the degree of association between at least two different nodes in a weighted linked database, for example. As used herein, a "blockchain node" or "node" refers to a grouping or collection of one or more addresses or accounts maintained in a distributed ledger, such as blockchain.

BACKGROUND

A blockchain is a type of distributed ledger with application in a number of areas including digital currencies, smart contracts, financial or data transfer transactions, business (e.g., decentralized autonomous organizations), and authenticated record management. Further details regarding the applicability of blockchain are described in National Archives and Records Administration, *Blockchain White Paper* (February 2019) (available online at https://www.archives.gov/files/records-mgmt/policy/nara-blockchain-whitepaper.pdf), herein incorporated by reference and Chen et al., *A Survey of Blockchain Application in Different Domains*, International Conference on Blockchain Technology and Applications (ICBTA) 2018 (Dec. 10-12, 2018), Xi'an, China (available online at https://arxiv.org/ftp/arxiv/papers/1911/1911.02013.pdf), herein incorporated by reference.

Distributed ledgers, such as blockchains, can be extremely powerful tools for managing and authenticating data. However, due in part to the complexity in its implementation, blockchain data is typically difficult to decipher and analyze. As a result, there exist concerns related to compliance (for example, proliferation of scams and hacks, lack of clarity on the origin of funds), investment (such as lack of information for assessing fundamentals and/or potentially poor-performing projects), data analytics (for example, lack of a reliable data source), and perception (that is, consumers may perceive the technology as risky).

In the compliance context in particular, there is especially a need to quickly, accurately, and easily identify and visualize common ownership or relationships between blockchain nodes, and in particular cryptocurrency accounts, in order to mitigate compliance and risk, such as when onboarding a new customer or considering making a cryptocurrency transfer or transaction with a prospective counterparty. For example, if a prospective customer or counterparty possesses cryptocurrency accounts with a high degree of association with blockchain addresses known to be involved in illicit activity, this may be an indicator that the prospective customer or counterparty may also be involved in money laundering or other potential criminal activity. Thus, there is a need to be able to analyze and quantify risks associated with blockchain nodes, especially in the cryptocurrency context.

As another example, there exists a need to be able to identify the owners of unidentified cryptocurrency addresses. For example, it may be helpful in the context of law enforcement investigations to assess whether an unidentified cryptocurrency address is highly associated with other cryptocurrency addresses whose owners are known, implying the unidentified cryptocurrency address may share common ownership.

In addition to the need to be able to attribute cryptocurrency addresses and clusters of blockchain nodes to entities as described above, there further exists a need to present and visualize blockchain data analytics in an optimal and user-friendly manner. Given the complexity of transfers and the large number of potential blockchain nodes involved in a given investigation or report, there is a need for a user interface with intelligent network expansion that automatically presents relevant blockchain node connections on a graphical user interface ("GUI") of an electronic display, as well as to allow users to filter and customize the information presented on the display after an initial report has been generated.

Current known methods for associating blockchain nodes rely on a heuristic-based, transaction-by-transaction approach. This type of approach fails to take into account additional relevant information and is prone to bias, resulting in less accurate data analytics.

U.S. Pat. Pub. No. 2020/0160344 (the "344 publication") to Jevans et. al. and assigned to CipherTrace, Inc., published on May 21, 2020, describes blockchain transaction analysis and anti-money laundering compliance methods. The method generally discloses generating a risk score for a proposed transaction between cryptocurrency accounts based on the number of connections to other risky accounts an account has and allowing or denying that transaction if the risk score falls within a certain range of values. Among other deficiencies, the methods of the '344 publication do not provide for at least associating a first blockchain node with a weight factor, determining a source value for a second node based on the weight factor and an edge weight, and generating a risk value for the second node based on the source value. Among other deficiencies, the methods of the '344 publication further do not provide at least a graphical user interface ("GUI") with intelligent network expansion that automatically displays relevant blockchain node connections as well as allows users to filter and customize the information displayed based on minimum dilution or the number of hops after an initial report has been generated.

International Patent Publication No. 2020/132246 A1 (the '246 publication) to McClelland et. al., published on Jun. 25, 2020, is directed to a method of tracing flow of tagged funds on a blockchain network. The method generally discloses obtaining a spending history for an identifier of funds, receiving a tagging profile including tagged transaction values and weight values, replaying tagging profiles against global transaction history to yield a propagation profile, determining whether the spending history satisfies an intersection conditions with respect to a propagation file, and transmitting an alert notification to a network participant. Among other deficiencies, the '246 publication does not provide for at least associating a first blockchain node with a weight factor, determining a source value for a second node based on the weight factor and an edge weight, and generating a risk value for the second node based on the source value. Among other deficiencies, the methods of the '246 publication further do not provide at least a GUI with intelligent network expansion that automatically displays relevant blockchain node connections as well as allows users to filter and customize the information displayed based on minimum dilution or the number of hops after an initial report has been generated.

U.S. Pat. Pub. No. 2019/0370797 (the "797 publication") to Jevans et. al. and assigned to CipherTrace, Inc., published on Dec. 5, 2010, is directed to systems and methods for automatically searching cryptocurrency transaction paths and discovering transaction flows between individuals and identifiable services. The '797 publication method generally discloses receiving a cryptocurrency record, automatically searching forward and backward transactions, determining a transaction flow with identifiable and unidentifiable addresses, removing irrelevant individuals and services, and displaying the known address in a transaction chain. Similarly, among other deficiencies, the '797 publication does not provide for at least associating a first blockchain node with a weight factor, determining a source value for a second node based on the weight factor and an edge weight, and generating a risk value for the second node based on the source value. Among other deficiencies, the methods of the '797 publication further do not provide at least a GUI with intelligent network expansion that automatically displays relevant blockchain node connections as well as allows users to filter and customize the information displayed based on minimum dilution or the number of hops after an initial report has been generated.

The systems and methods of the present disclosure may solve one or more of the problems set forth above and/or other problems in the art. The scope of the current disclosure, however, is defined by the attached claims, and not by the ability to solve any specific problem.

SUMMARY OF THE DISCLOSURE

According to certain aspects of the disclosure, systems and methods are disclosed for quantifying and electronically displaying the degree of association between two or more different blockchain nodes in a weighted linked database. In some embodiments, a node data set is obtained, and a node and edge data are extracted. A first node in the node data set is associated with a first weight factor, a first edge with the first node as a source node and a second node as a target node are identified, a source value for the second node is calculated based on an edge weight of the first edge and the first weight factor, a risk value for the second node is generated based on the source value and a total amount received value of a second node, and graphical depictions of the first node, the second node, the first edge, and the risk value for the second node are presented via a graphical user interface (GUI).

Systems and methods are further disclosed, according to certain aspects of this disclosure, for generating an improved GUI for an electronic display with intelligent expansion of blockchain data analytics and, in particular, automatically generating graphical depictions of blockchain data based on incoming transactions, outgoing transactions, and incoming and outgoing transactions simultaneously between blockchain nodes. In some embodiments, a plurality of nodes and edges may be presented on a GUI, an interactive histogram may be presented on a portion of the GUI, a graph parameters window including a dilution value filter element and a maximum hops filter element may be presented, and a user input may be accepted to generate different orientations of the plurality of nodes and edges. The systems and methods disclosed herein provide a technical solution to technical problems in blockchain transaction analyses by optimally restructuring blockchain data to provide more complete and reliable entity attribution, and intelligent and objective source node tracing. This results in more accurate blockchain tracing data analytics and an improved intelligent GUI that more accurately traces blockchain nodes than prior methods, and further provides a GUI that is customizable, visually appealing, and easier and more convenient for a user than prior methods for tracing and presenting blockchain node data set analysis on an electronic display.

In one embodiment, a computer-implemented method for quantifying and electronically displaying degrees of association between blockchain nodes in a weighted-linked database is disclosed. The method may comprise: obtaining a node data set comprising one or more nodes and one or more edges, each edge comprising data indicating a source node address, a target node address, and an edge weight; associating a first node of the one or more nodes with a first weight factor; identifying a first edge of the one or more edges, wherein the first edge comprises data indicating a source node address corresponding to the first node, a target node address corresponding to a second node of the one or more nodes in the node data set, and a first edge weight; determining a source value for the second node based on the first weight factor and the first edge weight; generating, a risk value for the second node based on the source value; and presenting, on a graphical user interface, a graphical depiction of the first node, the second node, and the first edge.

In another embodiment a computer-implemented method for quantifying degrees of association between blockchain nodes in a weighted-linked database is disclosed. The method may comprise: receiving a node data set comprising a plurality of nodes and a plurality of edges; extracting node data and edge data from the node data set, wherein the edge data comprises data indicating a source node address, a target node address, and an edge weight; and generating a graphical user interface based on the node data and edge data by: determining, for each node in the node data set, an initial cumulative vote total value; selecting a first node of the one or more nodes as an input node; identifying each edge of the one or more edges that indicates a source node address corresponding to the input node; for each identified edge, identifying a target node; modifying the initial cumulative vote total value of each identified target node based on the edge weight of each identified edge to generate an updated cumulative vote total value for the target node; and upon generating an updated cumulative vote total value for the target node, displaying, on the graphical user interface, an indicator of the input node, an indicator of each identified edge, and an indicator of the target node.

A system for quantifying degrees of association between blockchain nodes in a weighted-linked database is also disclosed. The system may comprise: at least one data storage device storing processor-readable instructions stored therein; and at least one processor configured to execute the instructions stored in the data storage device to perform a plurality of operations, including operations for: receiving a node data set comprising one or more nodes and one or more edges; extracting node data and edge data from the node data set, wherein the edge data comprises data indicating a source node address, a target node address, and an edge weight; associating a first node of the one or more nodes with a first weight factor; identifying a first edge of the one or more edges, wherein the first edge comprises data indicating a target node address corresponding to the first node, a source node address corresponding to a second node of the one or more nodes in the node data set, and a first edge weight; determining a source value for the second node based on the first weight factor and the first edge weight; and generating a risk value for the second node based on the source value.

BRIEF DESCRIPTION OF THE DRAWINGS

The accompanying drawings, which are incorporated in and constitute a part of this specification, illustrate various exemplary embodiments and together with the description, serve to explain the principles of the disclosure.

Figure 5:
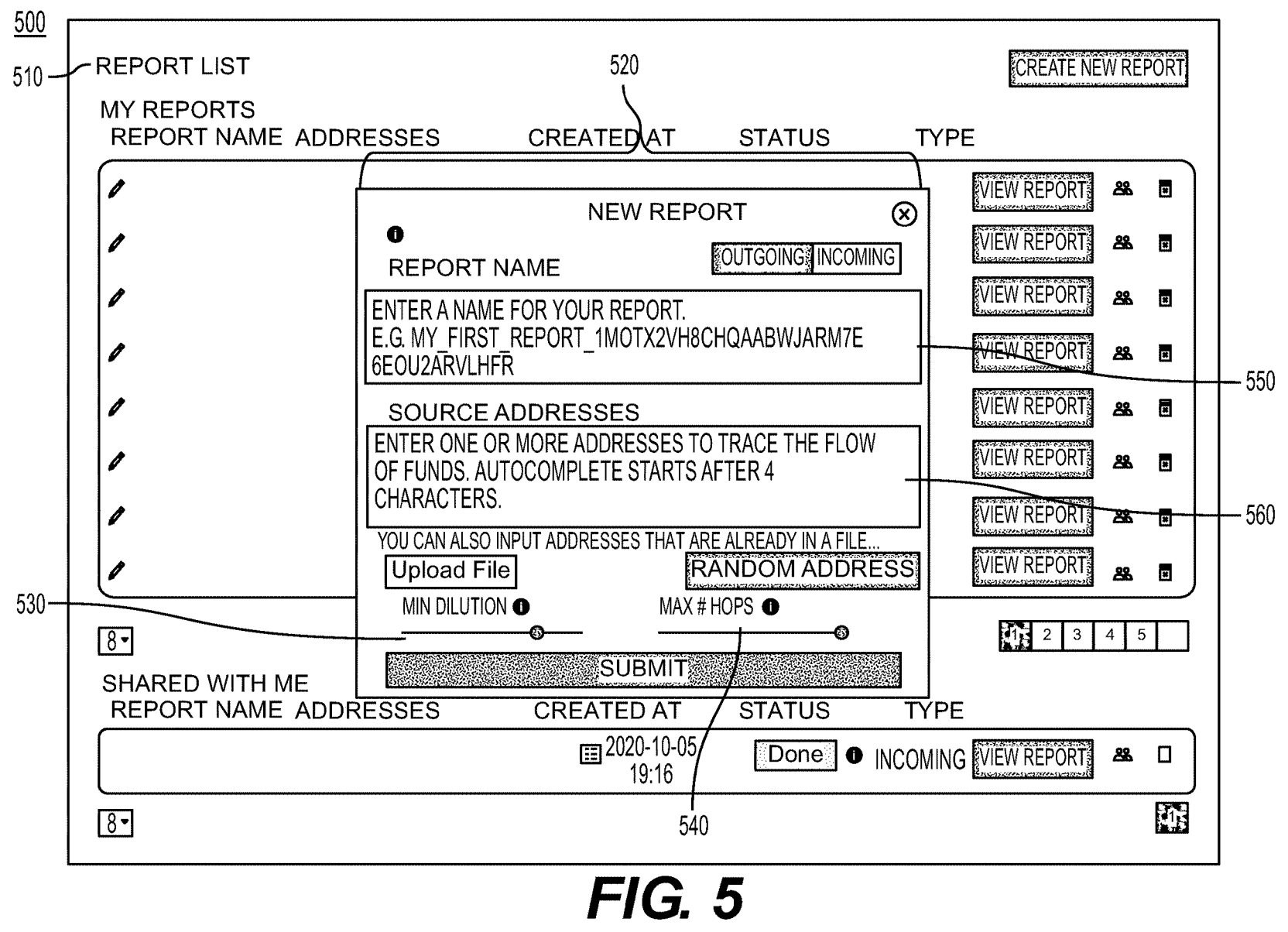

FIG. 5 depicts an exemplary GUI with a pre-report customization screen implemented on a portion of the GUI, according to one or more embodiments.

DETAILED DESCRIPTION

Figure 1:
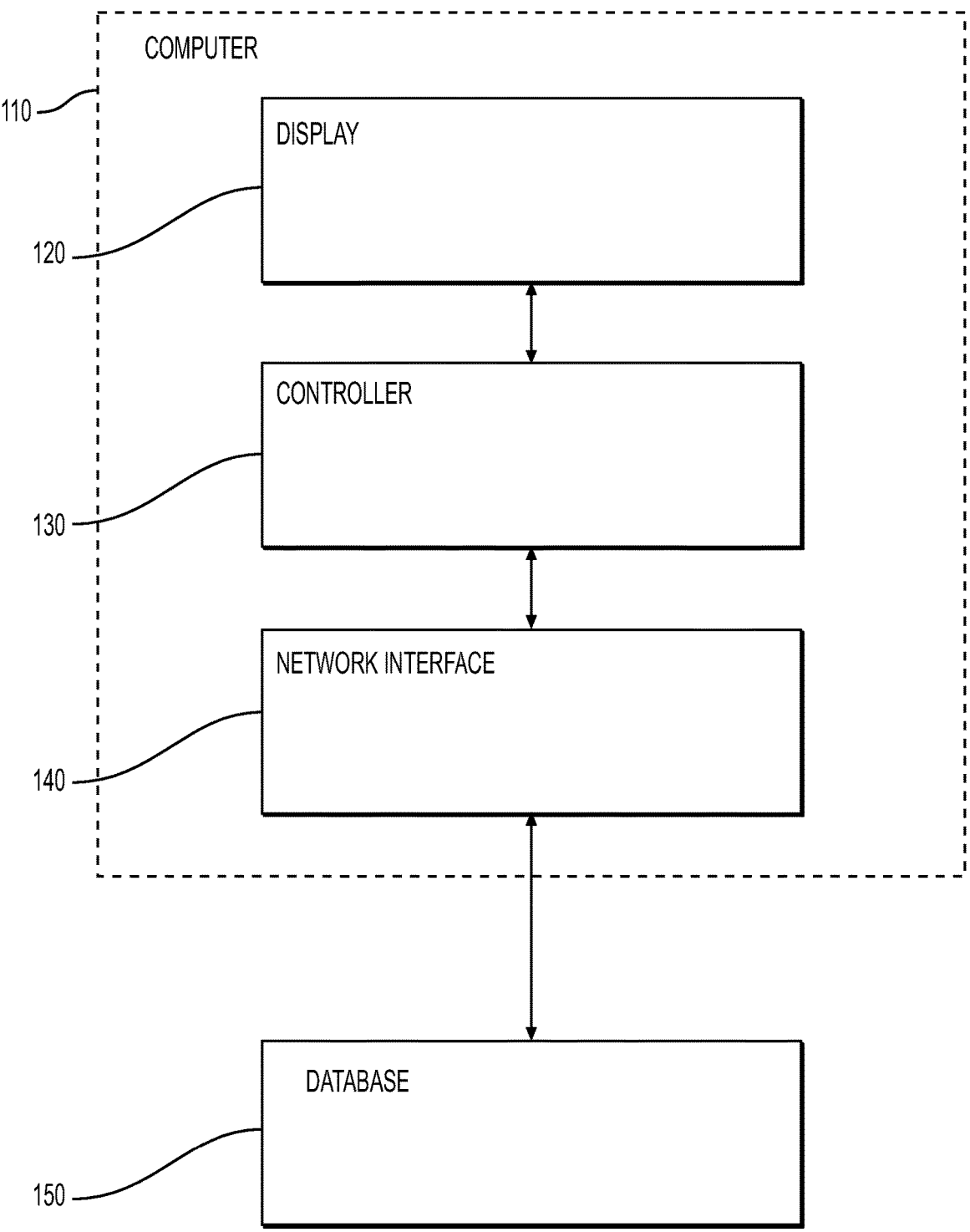
FIG. 1 depicts an exemplary block diagram of a system for a computing system having an electronic display screen with a graphical user interface (GUI) for analyzing and visualizing degrees of association between blockchain nodes, according to one or more embodiments.

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises, has, or includes a list of elements does not include only those elements, but may include other elements not expressly listed or inherent to such a process, method, article, or apparatus. As described herein, and as explained above, a "node" or "blockchain node" refers to at least one blockchain address such as a cryptocurrency address and an "edge" or "link" refers to a transaction or transfer occurring between two blockchain nodes, for example, a cryptocurrency transaction. While cryptocurrency addresses and cryptocurrency transactions are discussed herein, the disclosed methods may apply to other types of blockchain structures.

In this disclosure, relative terms, such as, for example, "about," substantially," "generally," and "approximately" are used to indicate a possible variation of ±10% in the stated value. The term "exemplary" is used in the sense of "example" rather than "ideal." As used herein, the singular forms "a," "an," and "the" include plural reference unless the context dictates otherwise.

As used herein, a blockchain refers to an open, distributed ledger (e.g., a shared permissioned ledger, a public ledger, and so forth) that in some embodiments may record transactions between parties to a payment transaction in a verifiable and a permanent way. Because the blockchain is open, e.g., accessible to the public, the resulting transactions are visible and transparent to the public. A blockchain is typically operated by many different parties that come to share consensus. A blockchain typically maintains a growing list of ordered records, known also as blocks. Each block in the blockchain may have both a timestamp and a link to a previous block, and records are typically not alterable retroactively. Each blockchain address or account may be owned or accessed by an entity or person, but the account may only be accessed by a person or entity with a private key corresponding to the blockchain node. A blockchain may be likened, by analogy, to a digital network of safety deposit boxes. These boxes may contain a digital asset (e.g., currency, securities, loyalty points, contracts). Each box is secured with a crypto private key (for example, a secret number). The owner of a box may use their crypto private key to access the box and transfer a digital asset to a second safety deposit box that belongs to a recipient, where the second box is secured by a crypto private key belonging to the recipient. The recipient may then retrieve the digital asset from their safety deposit box using their own crypto private key. Unlike safety deposit boxes, however, blockchain transactions, as explained above, may be accessed by the public.

A blockchain typically may include one or more of the following features. In some embodiments, a blockchain may include a database, and tabular schema may be used to encode core data types on top of a traditional database. In such embodiments, tables may consist of blocks, which may be bundles of transactions. Furthermore, such embodiments may be configured so that blockchain transactions or transfers may be all or nothing. A blockchain may be rendered immutable, ensuring that the data stored in a block cannot be changed. Each block in the chain may include reference to the previous block; as a result, in chains with a high rate of new transactions, the block may be securely linked to previous blocks. The block may also be replicated numerous times. Cryptography may be implemented to ensure that users of a blockchain may only be able to edit the parts of the blockchain that they "own" (where ownership is established by possessing unique private keys corresponding to that part of the blockchain). Cryptography may also ensure that copies of the distributed blockchain are kept in sync. Distributed ledgers ("shared ledgers") may also be used for transaction integrity. Accordingly, ledgers may be maintained by multiple parties across multiple computing devices. A consensus protocol may additionally be followed by each party to maintain a consistent view of the ledger. Distributed ledgers provide for greater resiliency against malicious attacks or system failures. Furthermore, a blockchain may be "permissioned" such that access is only granted to specific participants.

In some embodiments, a blockchain network may be based on bitcoin, litecoin, Ethereum, XRP, Tether, EOS, or on Ripple. Ripple is a real-time gross settlement system (RTGS), currency exchange and remittance network enabling secure, instant, and cheap global financial transactions with no chargebacks. Such blockchain networks may support tokens representing fiat currency, crypto, currency, crypto currency, commodity, etc. These blockchain networks may further be based around a shared public blockchain and/or shared ledger, which may use a consensus process that may allow for payments to occur in a decentralized, distributed process. While the above blockchain networks are used as example blockchain networks or platforms to serve the function of the settlement or transfer of funds, currency, and/or cryptocurrency, it is contemplated that similar blockchain networks that provide the benefits described above may be used. The methods disclosed herein are useful for any type of digital currency, including, for example, bitcoin, litecoin, Ethereum, XRP, Tether, EOS, and so forth.

FIG. 1 depicts an exemplary block diagram of a system 100 for an electronic display screen, according to one or more embodiments discussed herein. The system 100 may include a computer 110 for implementing a GUI according the principles herein and a database 150 for providing data to the computer 110. The computer 110 may include a display 120, a controller 130, and a network interface 140. The controller 130 may be integrated with, or separate from (but connected to or otherwise in communication with), the display 120, the network interface 140, the database 150, or combinations thereof. The display 120 may include any device capable of visual or tactile presentation of data and images in a form intelligible to a user. In some embodiments, the display 120 may present information dynamically in a visual medium. In some other embodiments, the display 120 may support a tactile display (display that may be felt by the fingers—and intended for the visually impaired) of data and images. In some embodiments, the display 120 supporting a tactile display may further be audio-enabled, such that parameter elements are associated with one or more sounds (e.g. musical tones, filtered noises, recorded sound effects, synthesized speech, and the like), in order to further assist a visually impaired user utilizing the display 120. Non-limiting examples of the display 120 may include a cathode ray tube, a liquid crystal display, a light emitting display, a plasma display, etc. In some embodiments, the display 120 may also accept input. In these embodiments, the display 120 may include a touch screen where information may be entered by selecting one of multiple options presented on the display 120. Selecting an option may be accomplished using a mouse (as is well known in the art), or touching an area of the display. In some embodiments, display 120 may comprise two or more displays in communication with controller 130.

The display 120 may be provided with a GUI, for example, a GUI as shown in FIGS. 5-15, by a controller 130. The controller 130 may include at least one memory device with processor-readable instructions stored therein to perform various control functions and operations; at least one processor executing the instructions from memory device to perform a set of desired operations; and a communication interface facilitating the communication between various system components. The instructions may be non-transitory computer-readable instructions for executing a control application. The communication interface of the controller 130 may enable the controller 130 to communicate with the display 120 and the network interface 140. Accordingly, controller 130 may be configured to generate and return a GUI on display 120 according to, for example, the methods and processes associated with FIGS. 2-3. Controller 130 may also include a wide variety of components or subsystems such as, processors, cache memory, memory controller, graphics controllers, network adapters, data processing devices, etc. In addition to performing logic, mathematical and other operations on data, the controller 130 may be configured to communicate or transfer data to and from the display 120, the network interface 140, the database 150, and so forth. Although embodiments herein may be discussed as being performed by controller 130, various steps may be performed partially or entirely by other components, controllers, processors, devices, servers etc.

Network interface 140 may be communicably connected to one or more databases or servers directly, or via a network, such as 3G/4G/5G wireless networks, a local area network (LAN), a wide area network (WAN), a private data network, a virtual private network (VPN), and/or a public data network, such as the Internet. Network interface 140 may include any appropriate type of network device capable of communicating with other computer systems based on one or more wired or wireless communication protocols. The network interface 140 may be configured to send data to and receive data from one or more databases, for example database 150, including sending and receiving node data set information containing edge data, node data, metadata, and so forth as described further below, and further may be configured to send data to and receive data from the controller 130.

Database 150 may be an integrated or separate database that may electronically organize and store data as well as provide that data to the computer 110 including display 120, controller 130, and network interface 140 as discussed above. Generally, the database 150 may include an interface, a controller, or other components necessary for storing blockchain node data and providing blockchain node data to computer 110. The database may contain information such as node data set information. The database 150 may also contain metadata for blockchain nodes or other information that may be helpful for implementing the disclosures described herein. Database 150 may comprise more than one database, and in some embodiments may be one or more of a hierarchical, network, object-oriented, relational, or non-relational/NoSQL database.

Therefore, the systems and methods of the present disclosure may present a GUI on a display 120 based on the degrees of association between first and second blockchain nodes in a weighted-linked database according to the embodiments described below.

Figure 2:
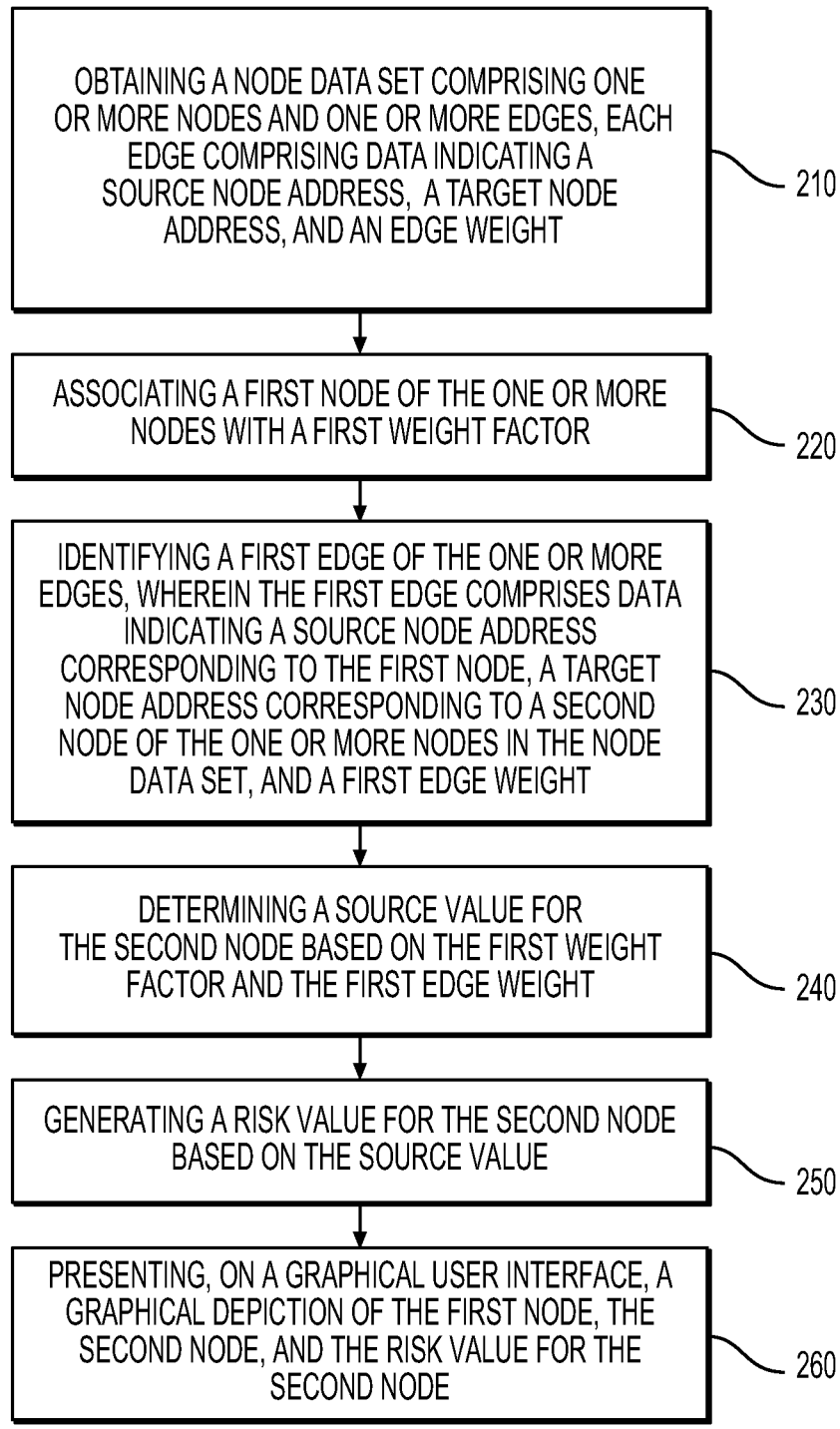
FIG. 2 depicts a flowchart for quantifying and electronically displaying degrees of association between first and second blockchain nodes in a weighted-linked database using a source value, according to one or more embodiments.
Figure 3:
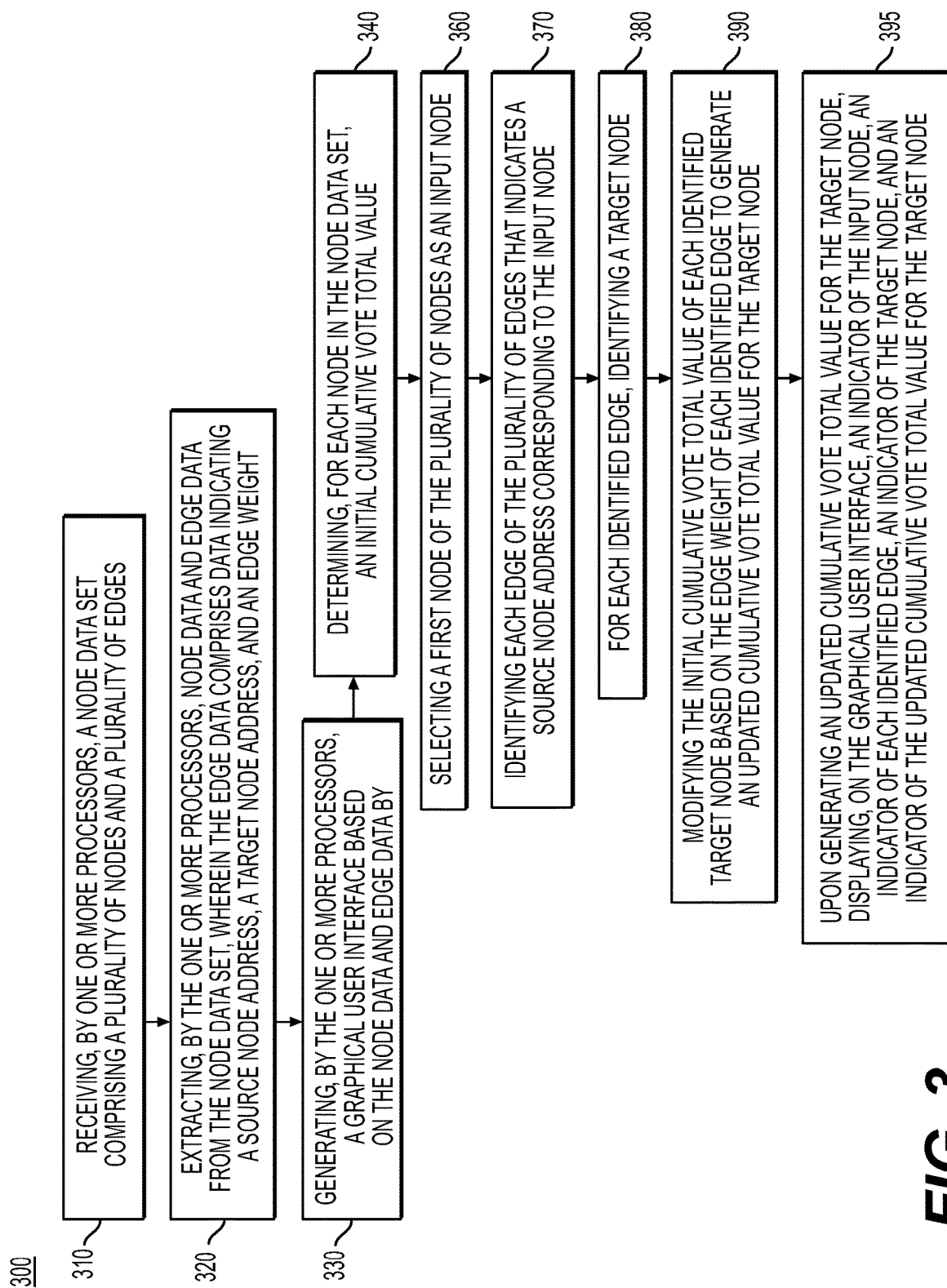
FIG. 3 depicts a flowchart for quantifying and electronically displaying degrees of association between a source and target blockchain nodes in a weighted-linked database using a cumulative vote total value, according to one or more embodiments.

Notwithstanding the depicted hardware modules and corresponding description of FIG. 1, it should be appreciated that FIG. 1 may describe any computing hardware, and that the methods of this application, including the method 200 of FIG. 2 and the method 300 of FIG. 3, may be performed by any computer or combinations of computers (from a single portable "smartphone" or wearable, to a complex network of servers or supercomputers). FIG. 2 depicts a flowchart for quantifying degrees of association between first and second blockchain nodes in a weighted-linked database using a source value, according to one or more embodiments. The method 200 may be performed by the controller 130 executing the control application, as discussed above with respect to FIG. 1. In some embodiments, the method 200 may be implemented with an Application Programming Interface (API) accessible to a user and presented by controller 130 on display 120, or the electronic display of any other computing device, as described above.

A user (for example, a financial custodian conducting ongoing know your customer and anti-money laundering ("KYC"/"AML") on their customer accounts) may, using the API, route their customer blockchain node transactions or transfers through the API automatically, and integrate the results into the user's own systems. Using the systems and methods disclosed herein, the user may be able to quantify degrees of association between blockchain nodes associated with its customers. In some embodiments, a user may request a report via a GUI for a node data set. Upon requesting a report, the methods and systems discussed herein are implemented by controller 130 and a report detailing risk scores for each node and a visualization of the node data set may be presented on the GUI.

The method may start at step 210, where a controller 130 obtains via network interface 140 a node data set comprising one or more nodes and one or more edges, each edge comprising data indicating a source node address, a target node address, and an edge weight. In some embodiments, the process will begin once a user requests a report via a GUI implemented on display 120. A node may comprise a cryptocurrency address. In some embodiments, a node may be designated or labeled as a "wallet." The wallet may contain multiple cryptocurrency addresses associated with a common owner or entity, for example, an exchange, a business entity, an individual owner, or any other entity associated with one or more accounts in the wallet. The node data set also comprises edges, wherein each edge may have edge data indicating a source address (from which a transaction originates), a target edge (where the transaction terminates) and an edge weight, which may be, for example, an indicator representing a value of a transaction.

In some embodiments, the edge weight may be a predetermined value, for example, a monetary amount representing the value of a cryptocurrency transaction associated with the edge. For example, a transfer of cryptocurrency from a blockchain node A to a blockchain node B might be valued at $10,000. In this example, the corresponding edge would have source address data for node A, target address data for node B, and an edge weight of $10,000. While a monetary amount for the edge weight is used exemplary herein, the edge weight may refer to other types of transfers or transactions, for example, records, raw materials transfers, messages, a computer instruction or smart contract, and so forth. In some embodiments, each edge may further be represented by a weighting value. The weighting value may be predetermined or derived, for example, in the case of a multilateral transaction. A node data set in some embodiments may be a partial or complete set of nodes and edges associated with a target node. For example, a node data set analyzed by the method 200 may comprise the nodes and edges depicted and described above with respect to FIG. 1.

In some embodiments, the controller 130, after obtaining the node data set, identifies nodes that are flagged, for example, flagged node 460 and flagged source node 465. As explained above, in some embodiments, a node may be flagged by a user due to previous associations with a known bad actor. In another embodiment, a node may be flagged because of unusual or suspicious activity. Whether a node is flagged or not may in some embodiments be determined prior to implementing the disclosed process. In some embodiments, a total amount received value may also be determined for each node in the node data set. For example, the total amount received value for an input node may be calculated by adding together each of the edge weights of all the edges in the node data set for which the input node is the target node. This process may be repeated for each node until a total amount received value is determined for all nodes in the data set.

At step 220, a first node from the node data set is selected by controller 130 and associated with a first weight factor. In some embodiments, the first node may be a flagged node. In this manner, the impact of a flagged nodes on other nodes in the data set may be assessed. In some embodiments, the first weight factor may be predetermined and, for example, may be set equal to one ("1"). Other weight factor values may be used depending on the design need. The first node and first weight factor in some embodiments may be associated as a first item and then placed into a queue. While a queue is discussed further herein, other data structures may be used for containing the first node and first weight, for example, an array, list, set, vector, stack, table, collection, and the like.

At step 230, the controller 130 may identify or select an edge from the node data set. As explained above, each edge comprises a corresponding source node address, a target node address, and an edge weight. In some embodiments, the edge selected may comprise a source node address corresponding to the first node selected at step 220. As explained above, an edge weight may be, for example, a monetary amount associated with a transaction. In some embodiments additional edges may be identified, for example, a second and third edge in the node data set may each comprise a source node address corresponding to the first node selected at step 220. The selected first edge may also comprise a target node address corresponding to a second node. The second and third edges may also comprise a target node address corresponding to the second node.

At step 240, the controller 130 may determine a source value (e.g., an amount from source value or an adjusted weight factor) for the second node identified in the first edge in step 230. The source value for the second node may be determined based on the first edge weight and the first weight factor. For example, the first edge weight may be a value such as a transaction amount associated with the edge, such as (500). The first weight factor may be set to equal 1. In some embodiments, the source value for the second node may equal the first edge weight times the first weight factor (500*1)=500. Further, the source value may be calculated based on multiple edges, for example, a second edge and a third edge with the second node as a source node as explained above at step 230.

For example, a second edge may comprise an edge weight equal to (250) and a weight factor equal to (1). A third edge may have an edge weight of (200) and a weight factor equal to (0.5). In this example, the source value may be calculated as a summation of values for each edge, so the source value for the second node may be (500*1)+(250*1)+(200*0.5)= (500)+(250)+(100)=(850). In some embodiments, a total amount received value may be calculated for the second node, and the source value may be calculated as the edge weight times the first weight factor divided by the total amount received value, as explained further herein. In some embodiments, the total amount received value may be calculated by adding together the edge weights of all edges where the target node is the second node. Using the example above with a first edge weight of (500), a second edge weight of (250), and a third edge weight of (200), the total amount received value could be calculated as (500)+(250)+ (200)=(950). The source value could then be calculated by dividing summation of values for each edge calculated above (here, 850) by the total amount received value (950) to obtain a source value of (0.894736842). The above values and formulas are exemplary, and other methods and values may be used in different combinations to generate the source value for the second node.

The controller 130 at step 250, may then generate a risk value for the second node based on the source value generated above at step 240. For example, the source value for the second node may be multiplied (by 100, for example) to generate a risk value of (89.4736842). The risk values may also be multiplied by other factors and normalized to a scale from 1-10. The risk value in some embodiments may correspond to a dilution percentage, for example (89.5%), that further may be utilized for generating a graphical depiction of the nodes and edges on a GUI as explained further below with respect to FIGS. 5-15.

At step 260, the controller 130 presents a graphical user interface (GUI) on a display 120 that depicts graphical indications or representations of the first node, the second node, and the first edge. A user, to begin the above mentioned process, may request a report by, for example, entering a user input into the display 120 via the GUI. In response, the methods and processes described herein may be implemented to generate the GUI on the display 120, and the calculated risk value for the second node and other relevant information is presented. Examples of some types of GUIs that may be presented on display 120 are provided below in FIGS. 5-15.

In some embodiments, the first item (comprising the first node and first weight) may be removed from the queue by the controller 130. For example, after being placed in the queue, when an edge is identified that comprises a source node address corresponding the first node and first weight, the first node and the first weight may be removed from the queue prior to calculating the source value and risk value for the second node as explained above at steps 230-260. Further, in some embodiments, the controller 130 may determine whether the second node is a "stop node" or a "flagged node." Whether a node in the data set is a stop node or a flagged node may be predetermined as explained above; for example, the second node may be a flagged node because the node address is associated with a data breach, fraudulent activity, illicit activity, illegal activity, or any other activity that may be designated as of interest to a user. If the second node is determined by the controller 130 to be a stopped or flagged node, the controller 130 may decline to place the second node into the queue.

If the second node is not a stopped or flagged node, or if no stopped or flagged node is identified, then the controller 130 in some embodiments may further determine whether the source value (a.k.a. adjusted weight factor) for the target node exceeds a predetermined source value (or weight) threshold. If the controller 130 determines that the source value does not exceed a predetermined threshold, then the second node and source value is not placed in the queue. If the controller 130 determines that the source value does exceed a predetermined value, then the source value (i.e. adjusted weight factor) is associated with the second node as a second item and then placed into the queue as a second item.

In some embodiments, the controller 130 may present via the GUI on display 120 a notification to a user indicating that the second node (or second node source value) exceeds a predetermined risk threshold. Steps 230 through 260 may then be repeated another item in the queue, for example, the second item including the second node and its associate source value, and using the second node in place of the first node as described above. In this example, an additional edge is identified where the second node is a source node and a third node is a target node, a source value for the third node is determined, a risk value for the third node is generated, the third node may be presented on the GUI on display 120 along with the additional edge, and then a determination is made by controller 130 as to whether the third node should be placed into the queue as explained above. The implementation of the GUI reflecting the data obtained via method 200 are described further below with respect to FIGS. 5-15.

While flagged nodes, stopped nodes, and a source value/ weight threshold are identified above as possible halting conditions for the process, these conditions may be modified or replaced with other possible halting conditions as is suitable for the particular design need. In some embodiments, for example, at step 230, the first edge identified may instead be one comprising a target node address corresponding to the first node and a source node address corresponding to the second node. Steps 240 through 260 may then proceed as explained above. In some embodiments, the process may continue with nodes and associated weight factors/source values being added and removed from the queue until all nodes have been analyzed and/or a stopping condition is met.

FIG. 3 depicts a flowchart for an alternate embodiment for quantifying and electronically displaying degrees of association between first and second blockchain nodes in a weighted-linked database using a cumulative vote total value, according to one or more embodiments. The method 300 may be performed by controller 130. For example, the method 300 may be implemented with an Application Programming Interface (API) accessible to a user as explained above implemented by controller 130.

At step 310, controller 130 receives a blockchain node data set comprising a plurality of blockchain nodes and a plurality of edges. As explained above with respect to FIG. 2, each node may comprise node data including at least one node address and in some embodiments, an account or identifier associated with the node. Each edge of the plurality of edges may comprise edge data indicating a source node address, a target node address, and an edge weight as previously explained. The edge weight may be associated or determined based on a corresponding transaction amount. At step 320, node data and edge data may be extracted by the controller 130 from the node data set. At step 330, the controller 130 generates a graphical user interface (GUI) based on the node data and edge data as follows.

At step 340, an initial cumulative vote total value is determined for each node. In some embodiments, the initial cumulative vote total value may be set equal to zero (0). A first node of the plurality of nodes at step 360 is then selected as the input node. In some embodiments, the input node may be a flagged node as described above, for example, a blockchain node that contains at least one address associated with an illegal activity, an illicit activity, or any other activity of interest to a user. At step 370, the controller 130 identifies each edge in the node data set that comprises a source address that corresponds to the input node. In other words, each edge that originates from the input node is identified. For each identified edge, a corresponding target node is identified at step 380.

At step 390, for each target node identified, the controller 130 may modify the initial cumulative vote total value of the target node to generated an updated cumulative vote total value for the second node. For example, the initial cumulative vote total value for the second node may be incremented by, for example, an edge weight or transaction value associated with the identified edge that corresponds to each target node. At step 395, upon generating an updated cumulative vote total value for the target node, the controller 130 will present, via a graphical user interface implemented on display 120, an indicator of the input node, an indicator of each identified edge, an indicator for each identified target node, and indicator of an updated cumulative vote total values for each identified target node. Some examples of the types of indicators contemplated herein are discussed with respect to FIGS. 5-15 below.

In some embodiments, the process above for method 300 may then be repeated for each of the identified target nodes with an updated cumulative vote total value. For example, for each identified target node, new edges are identified in the node data set where the identified target node is a source node and a new target node corresponding to the new edges are identified. For each new target node, the cumulative vote total values are then incremented or determined based on the transaction amount or updated as described above with respect to step 390. In some embodiments, a weighting value may be applied to reduce the amount that the cumulative vote total value is incremented. In this manner, as successive target nodes are identified, and the separation from the input node described above at step 310 increases (e.g. more hops/nodes/transaction separate from the input node), the impact of the input node on the cumulative vote total value for successive nodes is reduced. In some embodiments, the process is continued for each successive node in the node data set until a condition is met. In some embodiments, the process may terminate when a predetermined threshold is met, for example, a threshold for the cumulative vote total value increment or a threshold for the weighting value, or any other condition deemed suitable.

Once the process has fully propagated through the node data set, a risk score or trust score for each node or for an edge may also be calculated. The risk or trust score may be calculated based on the final cumulative vote total value for each node when the process is terminated. In some embodiments, the risk or trust score may be normalized to a scale from 0-100. As explained above, indicators for each identified new target node, identified new edge, and indicators for the risk and trust score may be generated by the controller 130 on the display 120 via the GUI. The implementation of the GUI on display 120 according to one or more embodiments is described further below with respect to FIGS. 5-15.

Figure 4A:
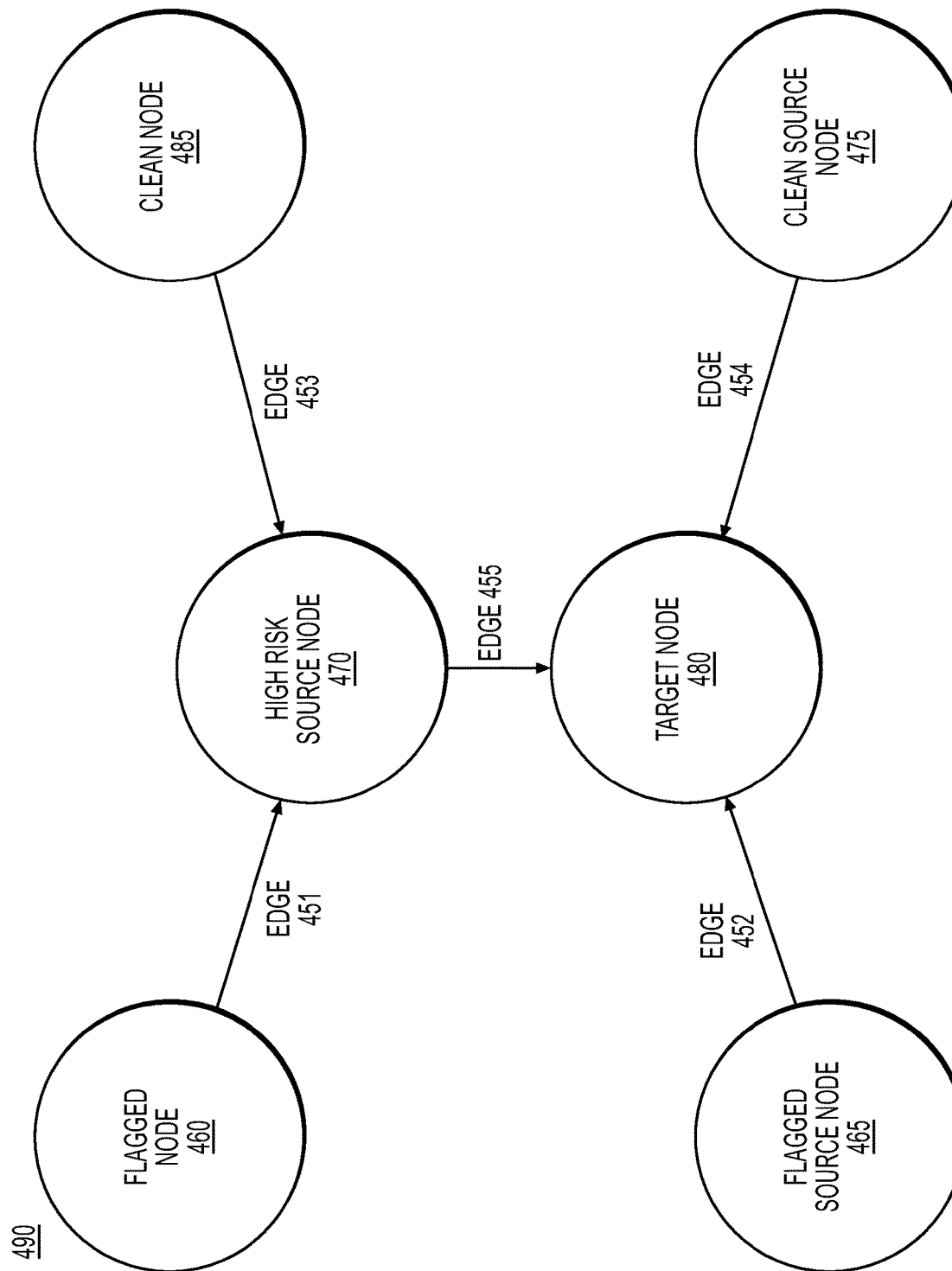
FIGS. 4A and 4B depict exemplary representations of blockchain node data sets comprising nodes and edges, according to one or more embodiments.

FIG. 4A depicts an exemplary embodiment of a representation of a node data set 490 comprising a plurality of nodes and edges. In this example, the node data sets 490 comprise a clean node 485, a flagged node 460, a flagged source node 465, a high-risk source node 470, a clean source node 475, a target node 480, and edges 451-455. In some embodiments, nodes may comprise a cryptocurrency address and a corresponding cryptocurrency account. Each edge may represent a source node address, a target node address, and a transaction amount. In this manner, each transaction from a source node to a target node is represented by an edge. For example, edge 452 represents a transaction between clean source node 475 and target node 480, and more specifically, a transaction from the clean source node 475 to target node 480, for example a transfer of cryptocurrency funds. In some embodiments, edges that do not directly terminate at the target node 480, but may still indirectly be related to target node 480, are also presented. For example, edge 453 has a source corresponding to clean node 485, and a target corresponding to the high-risk source node 470. Similarly, edge 451 may have a source corresponding to flagged node 460 and a target corresponding to the high-risk source node 470.

A "clean" node, as user herein, for example clean node 485 or clean source node 475, refers to a node whose ownership has been authenticated, or a node that is not the target of a financial transaction or transfer from one or more flagged account nodes, either directly or indirectly. A "flagged" node as used herein, for example flagged node 460 or flagged source node 465, may be a node whose ownership has not been authenticated, a node which contains cryptocurrency accounts associated with illicit activity, or is otherwise a node that has been designated of interest by a user. Whether a node contains cryptocurrency accounts associated with illicit activity may be determined through investigation, for example, an analysis of metadata or from a database using an attribution algorithm as explained further below. An at-risk source node, for example the high-risk source node 470, may be a node that is the target of at least one edge, for example edge 451, with a flagged node as a source node, for example flagged node 460.

As further depicted in FIG. 1, target node 480 is a target node of edge 452, edge 454, and edge 455. Target node 480 receives transactions (for example cryptocurrency funds) directly from a clean source node 475, a flagged source node 465, and the high-risk source node 470. Target node 480 may further receive transactions or funds indirectly from clean node 485 and flagged node 460 via the high-risk source node 470, which itself is a direct target node of flagged node 460 and clean node 485. Utilizing the methods and system described further herein, a risk factor or value may be generated for blockchain nodes in order to determine the strength of association between multiple nodes and one or more flagged accounts in a node data set. Accordingly, the trustworthiness, risk profile, or even the identity of the owner of a particular blockchain node can be quantified, verified, and/or predicted.

Figure 4B:
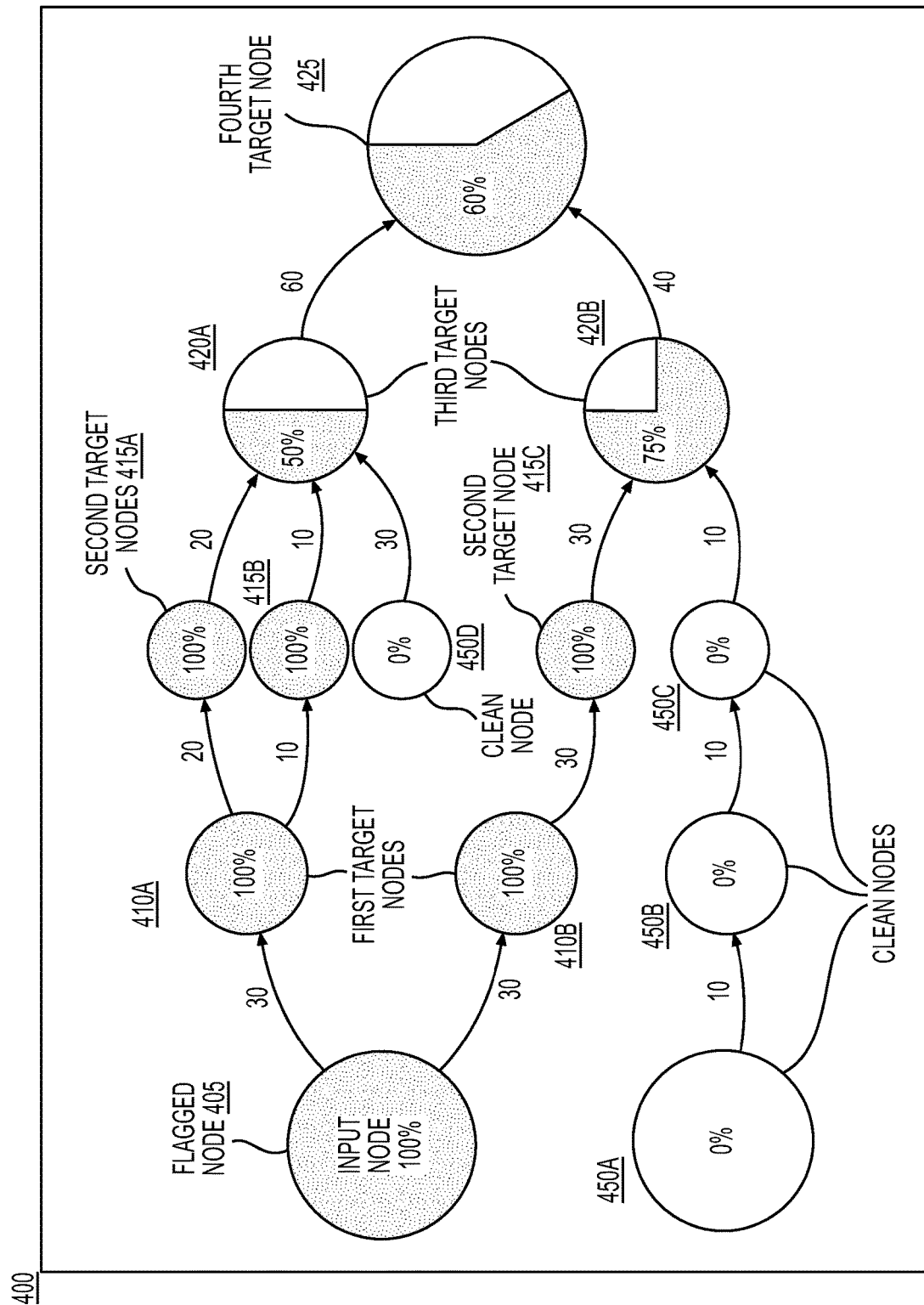

FIG. 4B is a simplified representation of a set of blockchain nodes and edges in a node data set 400 with exemplary risk values calculated for each node in the node data set, according to one or more embodiments. The node data set 400 of FIG. 4B comprises a Flagged Node 405, First Target Nodes 410A-C, Second Target Nodes 415A-C, Third Target Nodes 420A-B, Fourth Target Node 425, and Clean Nodes 450A-D. The exemplary node data set includes Flagged Node 405 that may comprise a node address associated with criminal or illicit conduct, or is known to be owned by an entity associated with such conduct. The node data set may also have a set of four clean nodes (Clean Node 450A, Clean Node 450B, Clean Node 450C, and Clean Node 450D) which are not flagged and are not directly or indirectly the target of a flagged node or a node that is the recipient of an edge from a flagged node. In other words, the Clean Nodes 450A-D in the node data set have not received or potentially received any funds from a flagged node.

As further shown in FIG. 4B, the flagged node has been selected as a first or input node as described above with respects to FIG. 2. In this case, the node data set has two edges where the Flagged Node 405 is the source node, with edge weights of 30 as shown in FIG. 4B. Each of the two edges, each with a target node that terminates at a First Target Node 410A and a First Target Node 410B. To calculate a risk value or dilution percentage as described above with respect to step 250, the system may determine a total amount received value for each of the first target nodes. One way that this may be calculated is by determining the total weight of all edges that target the first target nodes. In this example, each of the first target nodes in this node data set have only one of the two edges targeting one of First Target Node 410A and 410B, each with an edge weight of 30. Accordingly, a total amount received value may be set equal to 30 for each of the first target nodes.

A source value may then be generated for each of the first target nodes as described above with respect to step 240 based on the first weight factor, the first edge weight, and the total amount received value. In this case, the first weight factor may be set to 1 in the case where the flagged node is the source node. As such, the source value for the First Target Node 410a, for example may be set equal to the first edge weight times the first weight factor divided by the total amount received value. Thus, (30*1/30)=a source value of 1 for the First Target Node 410A. The source value may be multiplied by 100 to generate a risk score of (1*100)=100% risk value for First Target Node 410A. In some embodiments, the risk value may correspond to a dilution % as explained further below with respect to FIGS. 5-15. First Target Node 410B, which has an identical edge with a weight 30 from the Flagged Node 405, using the same calculation, will also have a source value of 1 and a risk score of 100.

Further with respect to FIG. 4B, the method 200 may then be repeated again with each of First Target Node 410a and First Target Node 410B as a first or input node. For example, following the process as explained above at step 220 of method 200, First Target Node 410A may be associated with a weight factor, which in this case may be set equal to the source value, which in this case is 1 as calculated above. The controller 130 may further, as explained above with respect to step 230 of method 200, identify each second edge where the source node is the First Target Node 410A. In this example, two edges are identified with First Target Node 410A a source node, with target nodes for the two edges being Second Target Node 415A and Second Target Node 415B. Then, as per step 240, a source value for each of Second Target Node 415A and Second Target Node 415B is generated based on the second edge weights of 20 and 10 respectively, the source value for First Target Node 410A (in this case, 1), and a total amount received value for Second Target Node 415A and First Target Node 415B.

As explained above, a total amount received value for Second Target Node 415A may be determined, and may be, for example, set to equal the total weight of all edges that terminate at Second Target Node 415A. In this case, only one edge terminates at Second Target Node 415A, so the total amount receive value for Second Target Node 415A may be set to equal 20 (the edge weight of the sole edge terminating at Second Target Node 415A). Accordingly, the source value for the Second Target Node 415A may equal the second edge weight times the First Target Node 410A source value divided by the total amount received value, which equals (20*1/20)=1. Repeating the process for Second Target Node 415B and Second Target Node 415c also results in a source value of 1 for both of these nodes.

The process of 200 may then be repeated again with Second Target Node 415A as the source or input node. As above with step 220, Second Target Node 415A is associated with its source value. Then, at step 230, each edge in the node data set with Second Target Node 415A as the source address is identified. In this case, only one edge is identified that originates from Second Target Node 415A, the edge with a weight of 20 that terminates at a Third Target Node 420A. In this embodiment, a total amount received value is calculated for Third Target Node 420A. In this case, there are three edges which a target node address corresponding to the Third Target Node 420A, with edge weights of 20, 10, and 30 respectively. The total amount received value may be set to equal the summation of all the edge weights, 20+10+30=60.

The source value for the Third Target Node 420A may then be determined. For example, in some embodiments, the source value may be calculated as a summation of each edge weight*source value of the source address of each edge divided by the total amount received of the target node. In this case, third Target Node 420A is a target of three nodes, Second Target Node 415A, Second Target Node 415B, and Clean Node 450D. A Clean Node may have a predetermined source value or weight, for example, a source value of 0. The Second Target Node 415B may have a source value of 1. As such the source value of the Third Target Node may be equal to the sum of the source value of Second Target Node 415A times the edge weight divided by the total amount received value of the Third Target Node 420A, the source value of Second Target Node 415B times the edge weight divided by the total amount received value of the Third Target Node 420A, and the source value of Clean Node 450D times the edge weight divided by the total amount received value of the Third Target Node 420A=(1*20/60)+(1*10/60)+(0*30/60)=0.5. The risk value may be set to equal to 100 times the source value. In this case, the risk value for Third Target Node 420A may be 50%.

Accordingly, the impact of a flagged blockchain node on other blockchain nodes in a blockchain node data set may be quantified. Further, based on the blockchain analytics methods disclosed herein, decisions can be made regarding approval or denial of transactions. For example, where a risk value for a node in a data set is determined to exceed a predetermined threshold, for example, 50%, then the controller 130 may determine that such nodes are high risk. Based on the risk value and predetermined threshold, the controller 130 may generate a notification to a user or entity via network interface 140, such as a bank or an investor, indicating that a risk value for a transaction or potential investment involves a blockchain node that exceeds a certain risk threshold. In some embodiments, the controller 130 may even send instructions or commands via network interface 140 to automatically deny a transaction or restrict or reduce an allowable transaction amount where the risk value for a source node exceeds the predetermined threshold.

Figure 6:
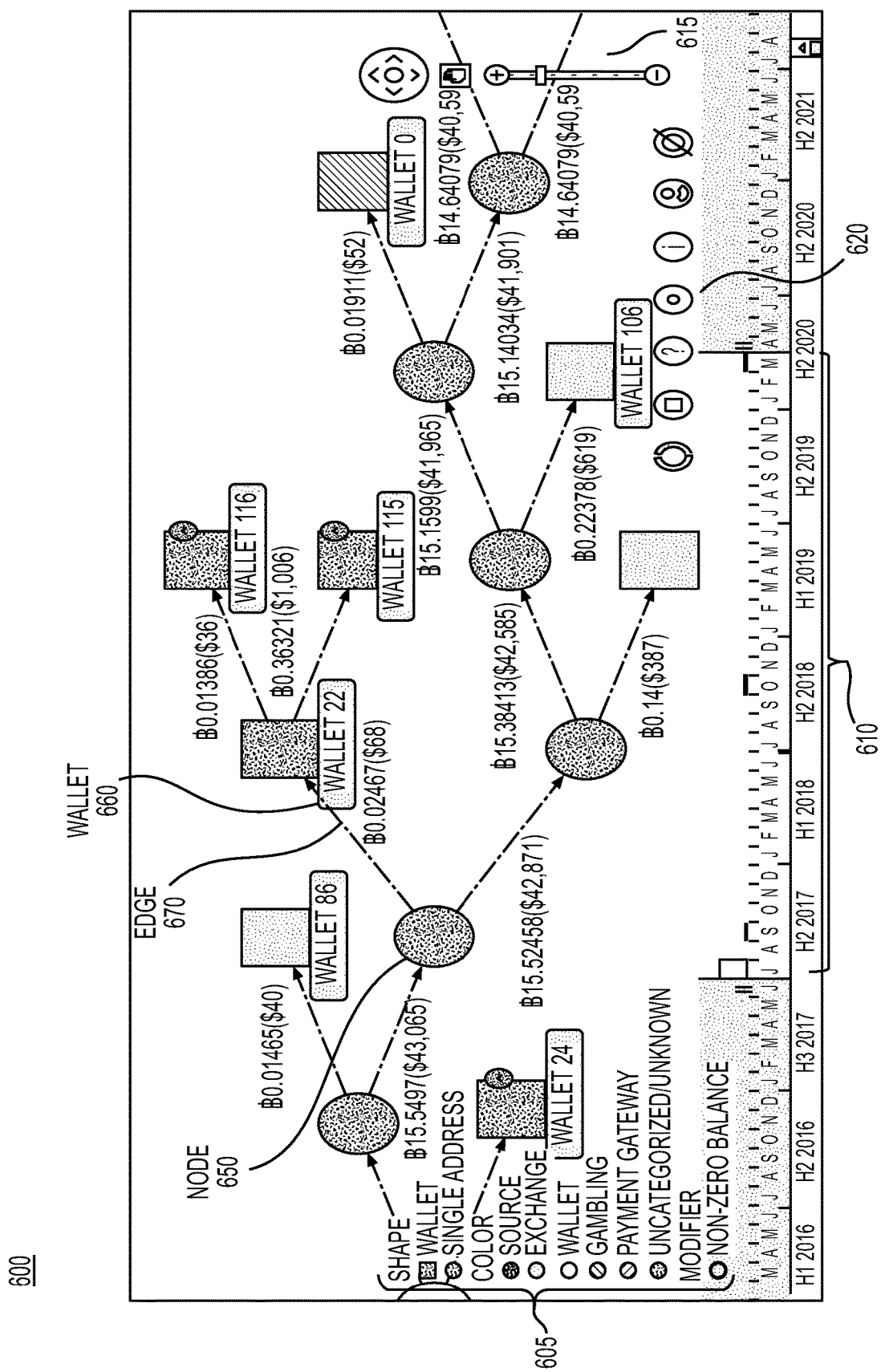
FIG. 6. depicts an exemplary GUI after a report has been generated, wherein details regarding a plurality of nodes and a plurality of edges are presented, according one or more embodiments.

FIGS. 5-15 depict exemplary GUIs presented to a user on display 120 according to one or more embodiments. FIG. 5 depicts an exemplary graphical user interface (GUI) with a customization screen implemented on a portion of the GUI prior to generating a report, according to one or more embodiments. In some embodiments, the controller 130 may generate, upon user request or automatically for example via a machine learning engine, a report for a node data set that comprises information regarding a node data set including the risk value scores for all nodes in the node data set as generated, for example, by the method 200 or method 300 as described above with respect to FIGS. 2 and 3. The report may further comprise a graphical depiction of the data as shown in FIG. 6 and discussed further below.

As shown above in FIG. 3, prior to a report being generating upon a user request, the GUI 500 may comprise a report list 510, a new report window 520, a minimum dilution input element 530, a maximum number of hops input element 540, a report name input element 550, and source address input element 560. A report list 510 may be an organized collection of reports previously generated by a user and accessible via GUI 500 by a user. Thus, a user may access previously generated reports for convenience and ease of use. While the new report window 520 is the form of a pop-up window that appears in front of a portion of the GUI 500 as depicted in FIG. 5, the new report window 520 is not limited to a pop-up window. For example, the new report window 520 could replace the GUI entirely such that only the new report window 520 is visible on the display 120. The GUI 500 further allows a user to specify a minimum dilution or the maximum number of hops for a report to be generated using the minimum dilution input element 530 and the maximum number of hops input element 540, respectively.

Dilution as used herein refers to the percentage amount that monitored funds are diluted as they are transferred from a source node to a destination node. For example, a destination node that receives a transaction of $10,000 from a monitored source node, and does not receive a transaction from any other node, would have no dilution. Subsequent transactions from that node would then be monitored and depicted. As another example, if the destination node receives a transaction of $10,000 from a monitored source node, but then also receives $10,000 from a second unmonitored source, the funds would have a dilution of 50%. If the user, for example, inputs a max dilution to 30% at the minimum dilution input element 530, then subsequent transactions from that node would not be depicted on the GUI once the report is generated.

In this manner, a user is provided via display 120 a customized graphical depiction of blockchain node transactions based in part on the user specified dilution. While the minimum dilution input element 530 is depicted as a sliding bar, other embodiments may use different methods for input of the dilution value, for example, a text box input, a vertical scale, voice input, or any other method for accepting a user input of the dilution value.

The maximum number of hops as used herein refers to the number of intermediary nodes between a source node and a destination node. For example, a user may be able to limit a search or graphic to a limited number of transfers in order to more easily navigate and visualize the relevant blockchain analytics data. For example, with reference to the node data set of FIG. 4B, relative to the Flagged Node 405, presenting a maximum number of one (1) hop would result in only the First Target Node 410a and 410b being analyzed, as those are a single hop (1 edge transaction) away from the flagged node 405. On the other hand, again with respect to FIG. 4B and the Flagged Node 405, presenting a max number of hops equal to three would further include the Second Target Nodes 415a-c and the Third Target Nodes 420a-b, as each of those nodes is within three hops of the Flagged Node 405.

In this manner, a user, prior to controller 130 generating a report, may set desired parameters as needed by inputting a maximum number of hops value into the maximum number of hops input element 540. Again, while a sliding bar is depicted, other widgets or known methods of receiving input, for example, a text box input, a vertical scale, voice input, or any other method for accepting a user input of the dilution value, may be implemented. The report name input element 550 of the new report window 520 allows a user to input a name for the newly generated report; in this manner, reports may be organized and saved by users via the GUI for ease of use. Similarly, source address input element 560 allows a user to directly input one or more source node addresses that may be used to generate node data sets for analysis.

FIG. 6 depicts a GUI 600 presenting a graphical depiction of blockchain nodes and transactions between the nodes after a report has been generated as described above, according to one or more embodiments. The graph may reflect data contained in one or more reports that have been requested by a user and generated using the methods and systems described above with respect to FIGS. 2-4. In some embodiments, each edge is represented by an arrow that originates from a source or input node or wallet and terminates at a target node or wallet, and may further include a value that corresponds to an edge weight. For example, edge 670 is depicted with an edge weight of $68 in FIG. 6. Nodes may be represented by circles, for example, the node 650 is depicted with a circle shape, and may have a source address, or portion thereof, displayed with the circle node 650. Wallets, which may contain multiple addresses, may be represented by a rectangle, for example, the wallet 660.

The nodes may represent different types of blockchain entities, for example, sources, exchanges, wallets, gambling, payment gateways, unknown nodes, and so forth. As depicted, a legend 605 may be provided as shown in FIG. 6 to provide the user with ease of understanding the various elements presented on display 120. A filter input element 610 may also be implemented on the GUI 600, which enables a user to filter or modify the nodes and edges displayed based on a parameter, for example, time, risk values, source values generated according to the disclosure, and so forth. The GUI 600 enables a user to zoom in and out and view further or less details using a zoom control element 615. The GUI 600 may also include a toolbar 620 presented on display 120. In some embodiments, the graphical depiction may show all transactions over a time period between all of the nodes depicted. In this manner, via the GUI 600, a user may be able to quickly and easily visualize relationships at a high level between a set of nodes. The GUI 600 in some embodiments may permit a user to select a node in order to view additional information about the node, including information that may not have been depicted when the graph was originally generated. In some embodiments, graphical depictions of blockchain nodes and corresponding transactions are automatically expanded and presented to a user on display 120 when a report is generated. This may allow for easier visualization and navigation of all relevant blockchain nodes and corresponding transactions. The nodes which are expanded may be determined based on different factors, including for example the methods described for quantifying degrees of relationship between nodes as explained above with respect to FIGS. 2-4. For example, nodes with risk values that exceed a predetermined threshold may be displayed or marked with a color or other indicator, while nodes that do not exceed a predetermined threshold may be hidden from view or marked with a different color or other indicator to facilitate easier review of the report.

Additional features may be implemented to improve the GUI 600 for generating and presenting blockchain analytics data. For example, a user may be able to choose between one or more custom layouts for viewing blockchain transactional data by, for example, selecting such options in toolbar 620 presented on the GUI 600 presented on display 120. Further, entities or nodes may be combined into the same "wallet," for example the wallet 660, which may be a known group of nodes for monitoring, as depicted in FIG. 6. In some embodiments, multiple nodes can be combined into the same named entity, for example, all nodes belonging to a particular corporation or business. As another example, nodes may be combined together based on entity type, for example, nodes used for gambling may be combined together for analysis according to the methods disclosed herein. In some embodiments, the grouping of the nodes may be determined based on the methods for quantifying degrees of relationship described above with respect to FIGS. 1-4.

In some embodiments, additional data may be received by controller 130 via network interface 140 from external sources, for example, databases containing known information for particular blockchain nodes, which may then be used to more accurately group and associate blockchain nodes. In some embodiments, the relevant data for attributing nodes may also be obtained from metadata associated with the nodes. In further embodiments, attribution data may be solely obtained from metadata associated with nodes, without any input from external services. Attribution data may also be obtained by analyzing direct interactions with entities, social media or online forums, open source intelligence, court documents, and so forth. Further, attributing nodes may also be obtained using clustering algorithms to determine common ownership of nodes.

Figure 7:
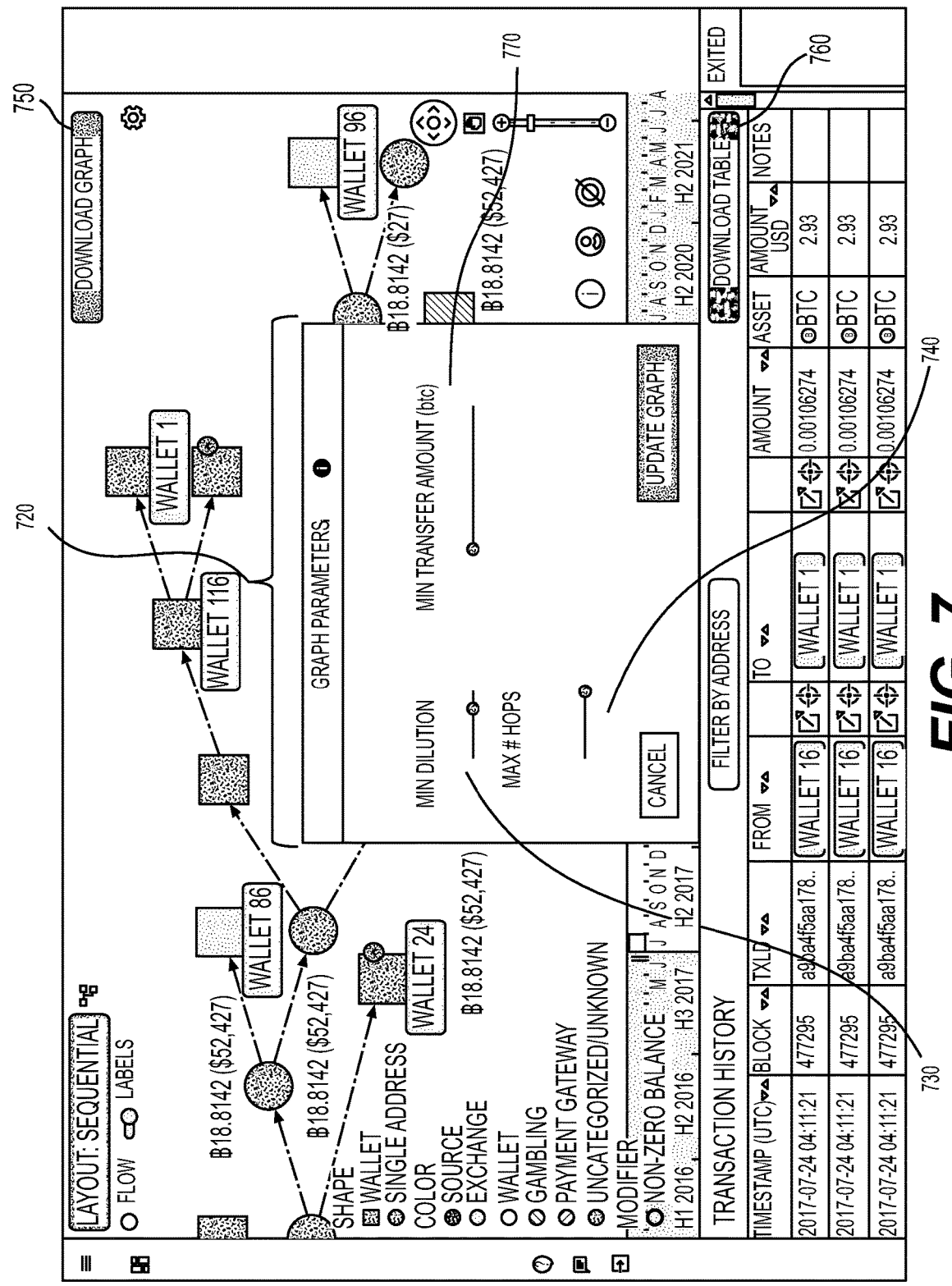
FIG. 7 depicts an exemplary GUI with a customization screen implemented on a portion of the GUI for a user to modify dilution percentage, minimum transaction amount, and/or degrees of transactional hops after an initial report has already been generated, according to one or more embodiments.

With respect to FIG. 7, after a report has been generated an initial node data set is presented in a graphical format on the GUI 700 on display 120, a graph parameters window 720 may be displayed on GUI 700, wherein the graph parameters window 720 comprises a minimum dilution input element 730, a maximum number of hops input element 740, and a minimum transfer amount input element 770. While the graph parameters window 720 is depicted as a pop-up window over a portion of the GUI 700, with some indicators of the nodes and edges still visible in the background on GUI 700, the graph parameters window 720 is not limited to a pop-up window. For example, the graph parameters window 720 could replace the GUI entirely such that only the graph parameters window 720 is visible on the display 120. Thus, after a graph is generated and a node data set is initially depicted on the display 120, a user may be able to select and change the nodes and edges of the node data set that were previously displayed in the report, for example, by determining a minimum transfer amounts (e.g. minimum edge weights) or by determining a minimum dilution and/or maximum hops as described above with respect to FIG. 5. By setting a minimum transfer amount using the minimum transfer amount input element 770, a user may be able to filter out smaller or minor transactions that are not of interest to the user. This feature further enables a user to more quickly obtain relevant data analytics, because the user does not have to request an entirely new graph and report to be generated each time a parameter such as dilution, hops, or minimum transfer amount is changed. An example of an updated graph based on changes input into by a user into the graph parameters window 720 after a first report is generated is depicted below in FIG. 8. While sliding bars are depicted in FIG. 7 for the minimum dilution input element 730, the maximum number of hops input element 740, and the minimum transfer amount input element 770, other widgets or known methods of receiving user inputs or values, for example, a text box input, a vertical scale, voice recording input, multiple choice selection, or any other method for accepting a user input for a value via a GUI implemented on a display 120 may be provided. While the graph parameters window 720 provides three parameters that may be modified here as exemplary, in some embodiments, the user interface may also enable the user to define his or her own set of parameters for organizing groups of blockchain nodes instead of, or in addition to, transfer amount, dilution, and maximum number of hops. Additionally, as shown in FIG. 7, data generated and displayed on GUI 700 may be downloaded and viewed by a user later. For example, a user may select a download graph input element 750 to download a portion of the graph, including, for example, a screenshot of the graph. A user can additional select a download table input element 760 to initiate download of table data containing node data and edge data.

Figure 8:
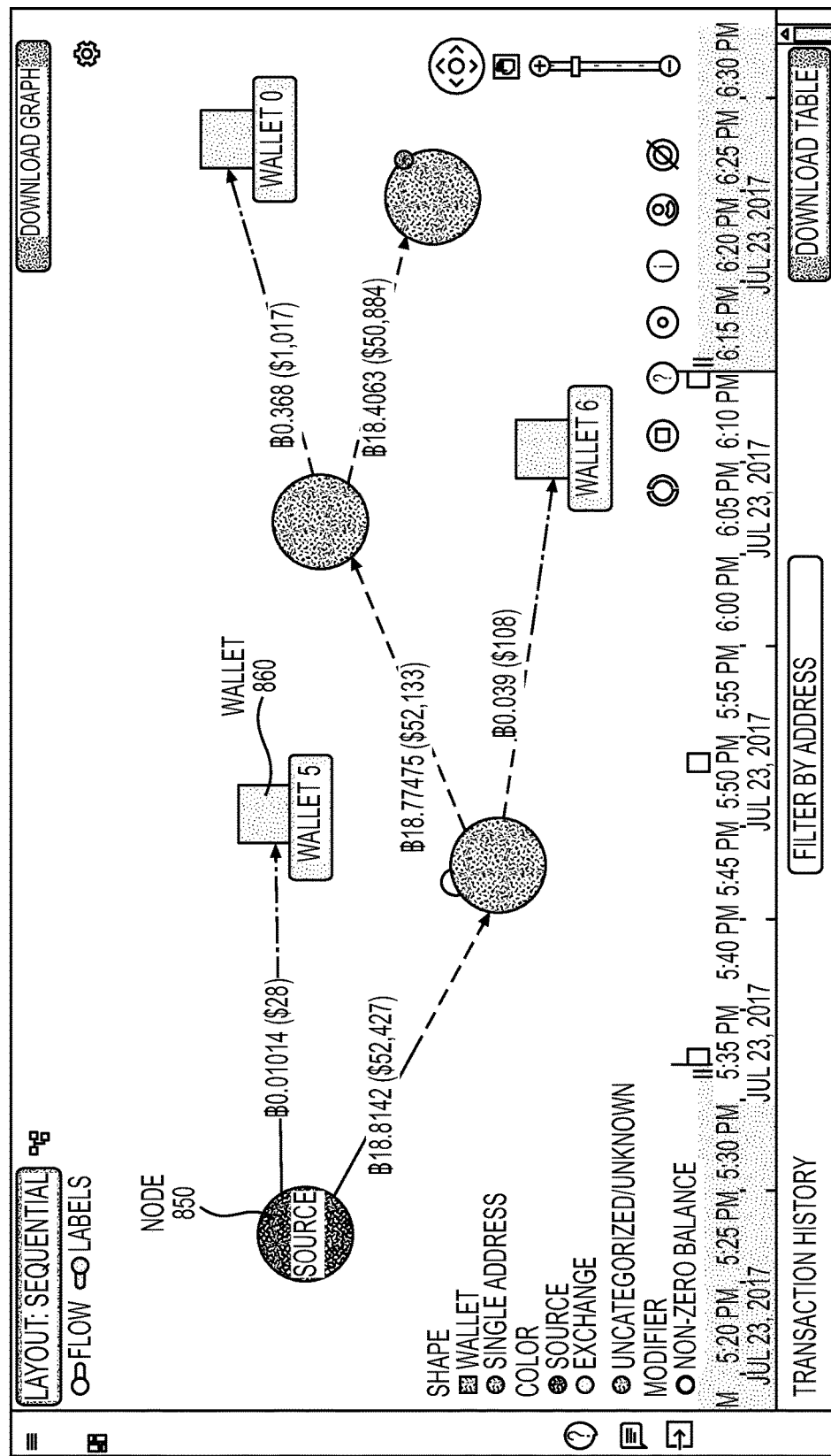
FIG. 8 depicts an exemplary GUI for cryptocurrency tracing, wherein a reduced number of node and edges are presented on an electronic display after a user input, according to one or more embodiments.

FIG. 8 provides an exemplary depiction of a GUI 800 presented on display 120 after a user has provided input in graph parameters window 720 as described above with respect to FIG. 7. In this example, the user has input a maximum number of hops=3. Accordingly, a limited number of nodes in the node data set related to the source node 850 is presented on the user interface (as compared to FIG. 6, where a larger subset of the node data set is depicted as explained above). Only nodes or wallets that are three or fewer transactions away from the source node 850 are depicted in this example, for example, wallet 860. This feature gives the user the ability to quickly navigate and change the presented data. In some embodiments, different colors and shapes may be used to depict the data or information type. For example, the source node may be depicted as a red circle, cryptocurrency exchanges or wallets may be depicted as blue squares, and intermediary nodes may be depicted as gray circles, as shown in FIG. 8.

Figure 9:
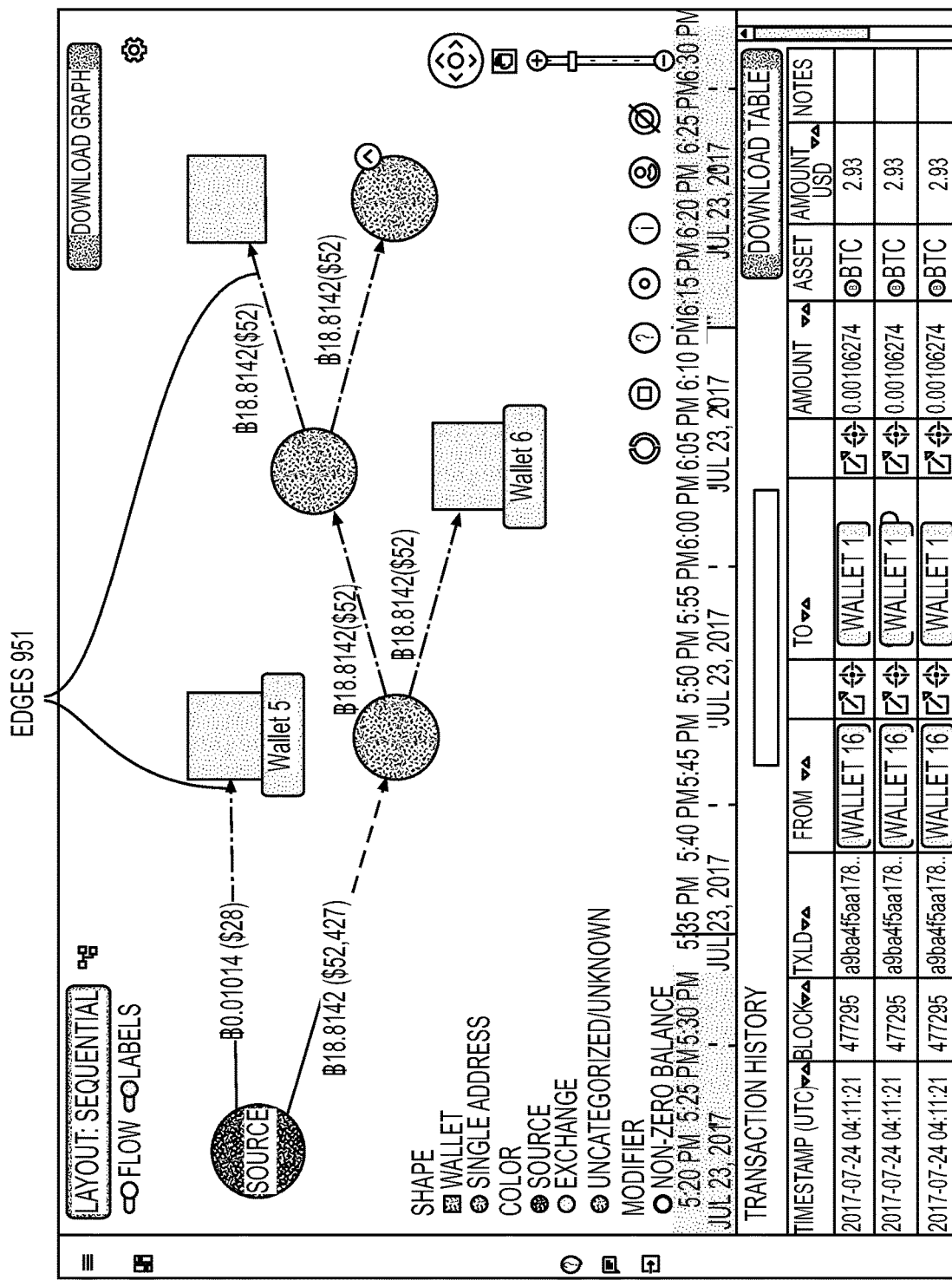
FIG. 9 depicts an alternative exemplary GUI with animated edges, according to one or more embodiments.

FIG. 9 depicts an alternative exemplary GUI 900 presented on display 120 with animated edges, according to one or more embodiments. GUI 900 includes edges 951 which are animated to more easily depict to the user the flow or transfer of transactions and funds between nodes. An example of this is shown below in FIG. 9, where the dashed lines of edges 951 represent an animation indicating a direction of flow. This technical feature improves visualization of the GUI and makes it easier for a user of the system to track the flow direction of funds in order to avoid user error. While dashed lines are used here, other animations or effects may be implemented depending on the design need or user preference.

Figure 10A:
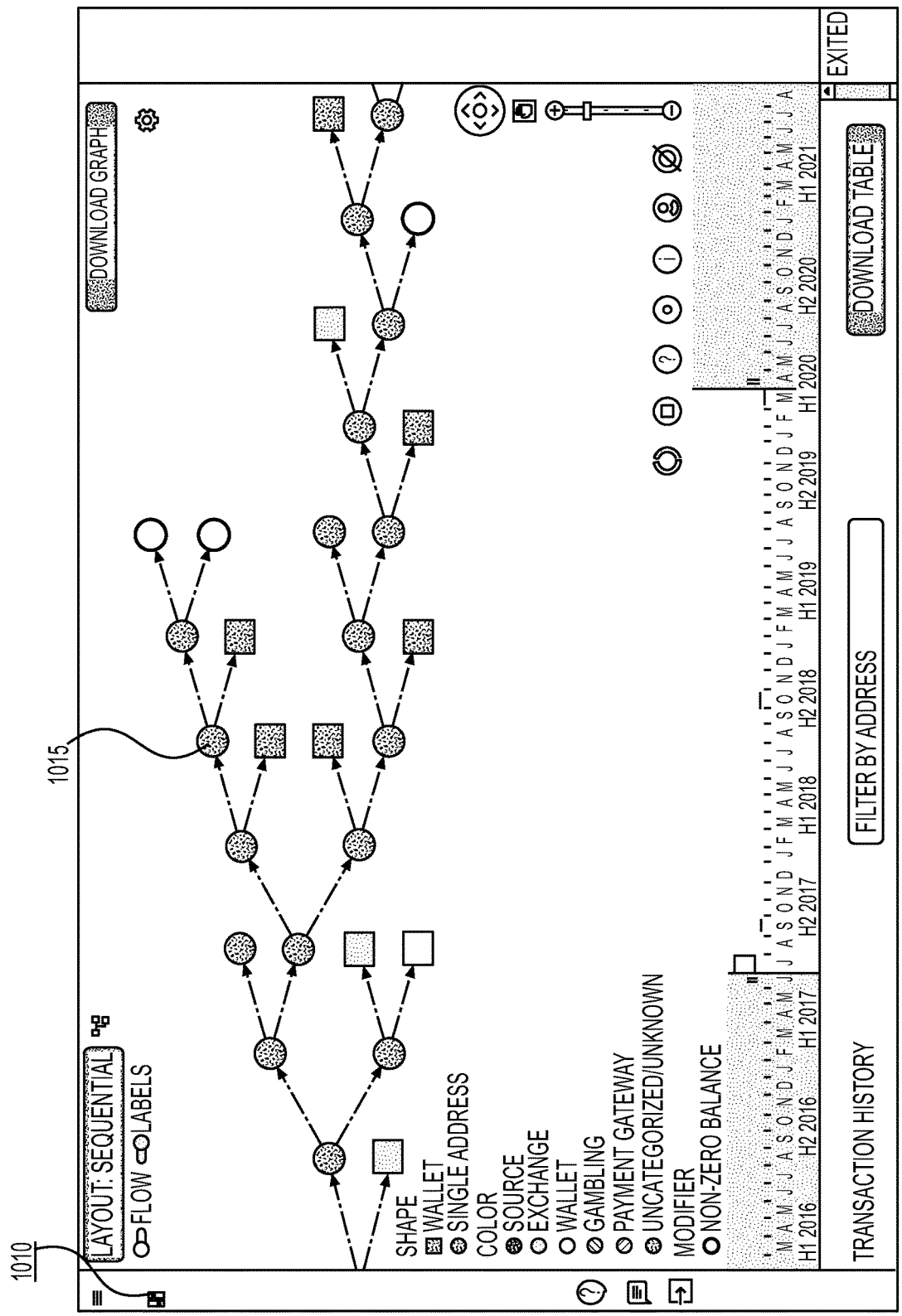
FIGS. 10A-C depict alternative exemplary GUIs, wherein certain nodes, such as nodes which are not attributed to any known actors or are not of interest to the user, may be condensed or concealed from view, according to one or more embodiments.
Figure 10B:
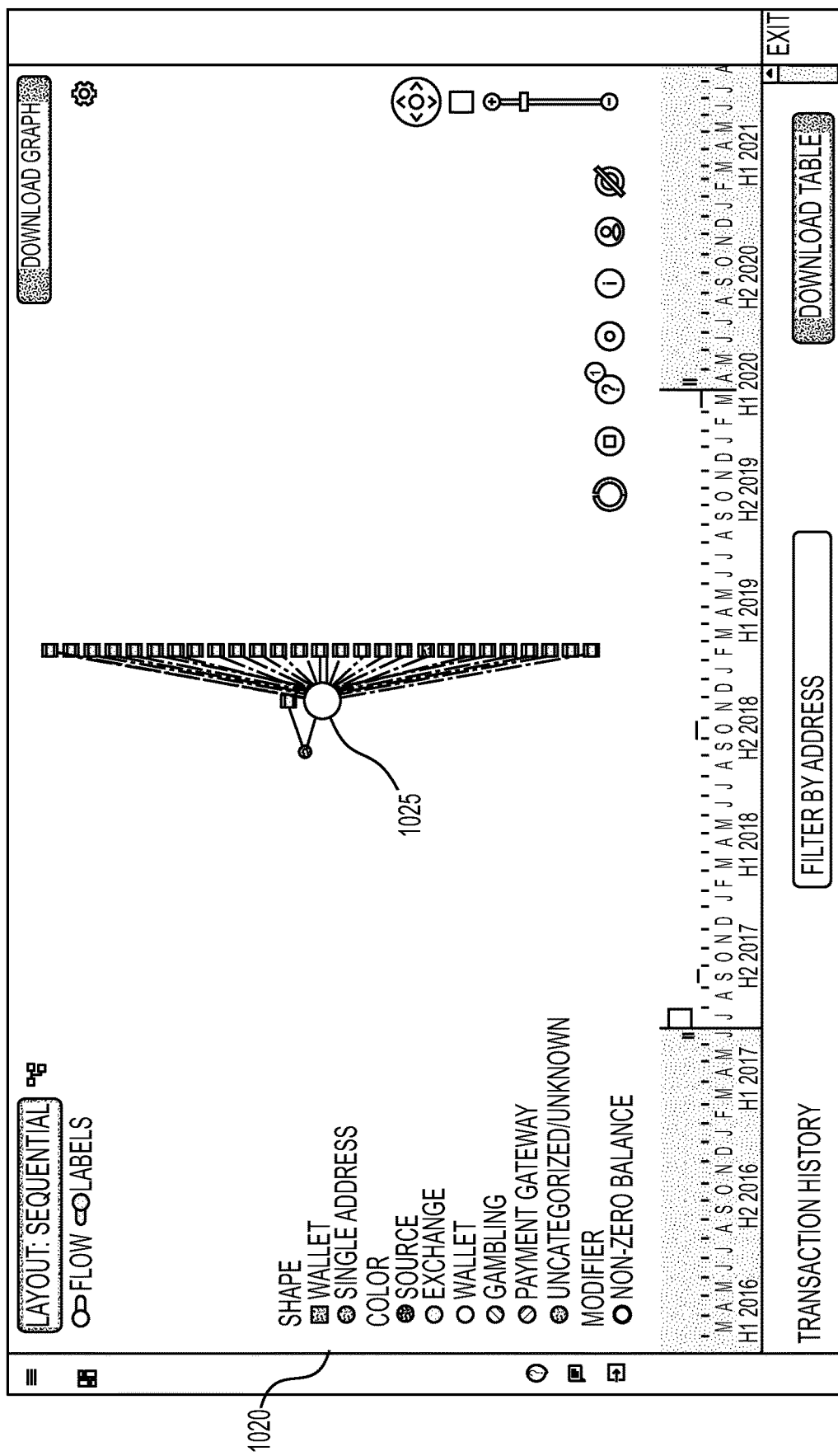
Figure 10C:
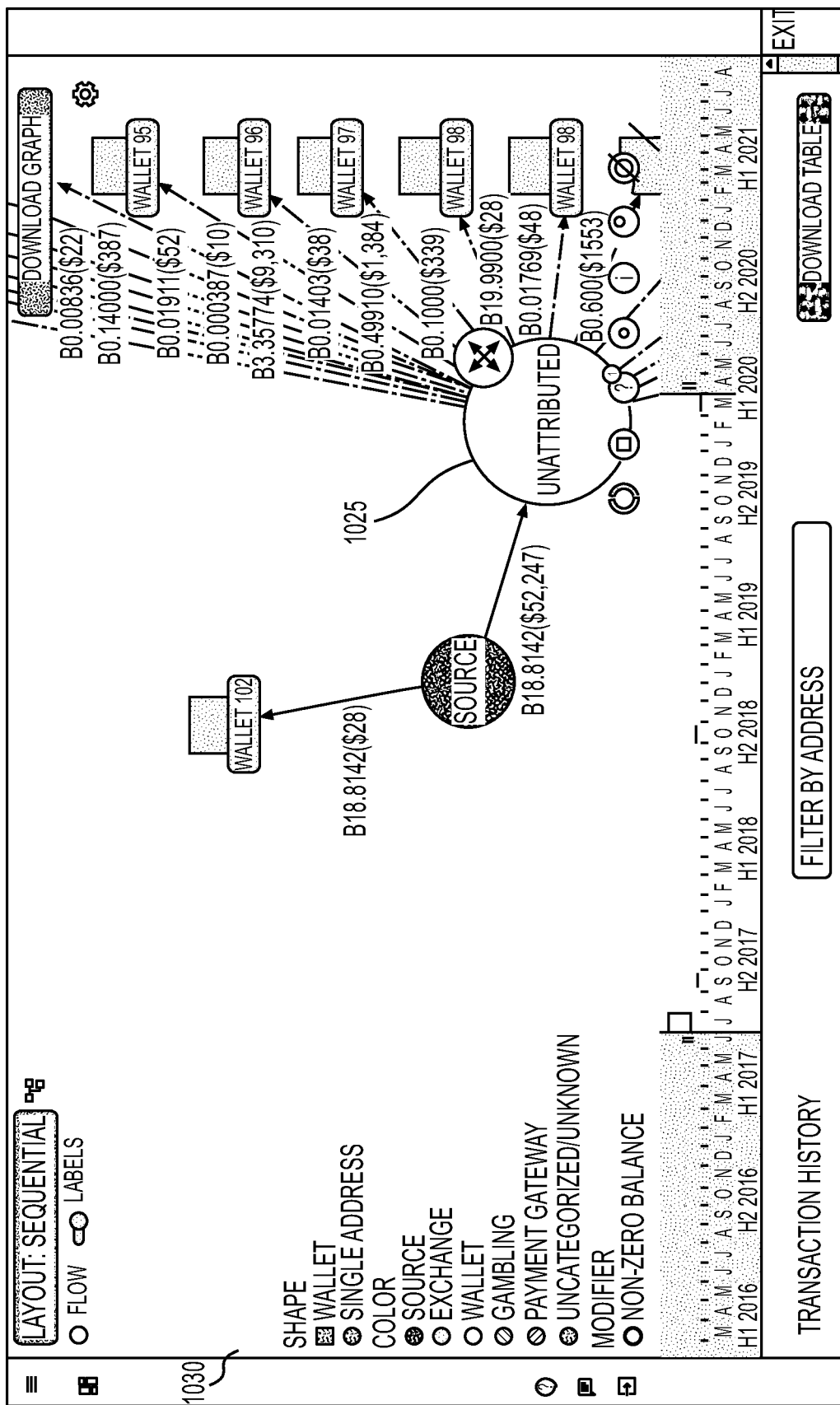

FIGS. 10A-C depict alternative exemplary GUIs presented on display 120, wherein certain nodes such as nodes which are not attributed to any known actors or are not of interest to the user may be condensed or concealed from view, according to one or more embodiments. To facilitate easier viewing, in some embodiments, transactional data or blockchain nodes which are not attributed to a source or particular entity (for example, nodes that are not attributed to any known actors or of interest to the user) may be condensed in order to improve the visibility of nodes of interest to the user. For example, FIG. 10A depicts an exemplary GUI 1010 wherein all the nodes and edges of the node data set are generally visible, including for example, a node 1015 that is not flagged or not of interest to the user or is not attributed to any known actors (for example, a clean node as discussed above with respect to FIGS. 4A-B or a node with a risk value that falls below a certain threshold). FIG. 10B depicts a GUI 1020 where the node 1015 and other intermediary nodes in the node data set are consolidated into an unattributed element 1025. This becomes more clear in FIG. 10C, which depicts an exemplary GUI 1030 after the user has zoomed in more closely on the GUI 1020 of FIG.

10B and unattributed element 1025. In this manner, data may be organized in a manner that reduces visual overload of a user, and allows a user to control and modify the presentation of relevant information on display 120.

Figure 11:
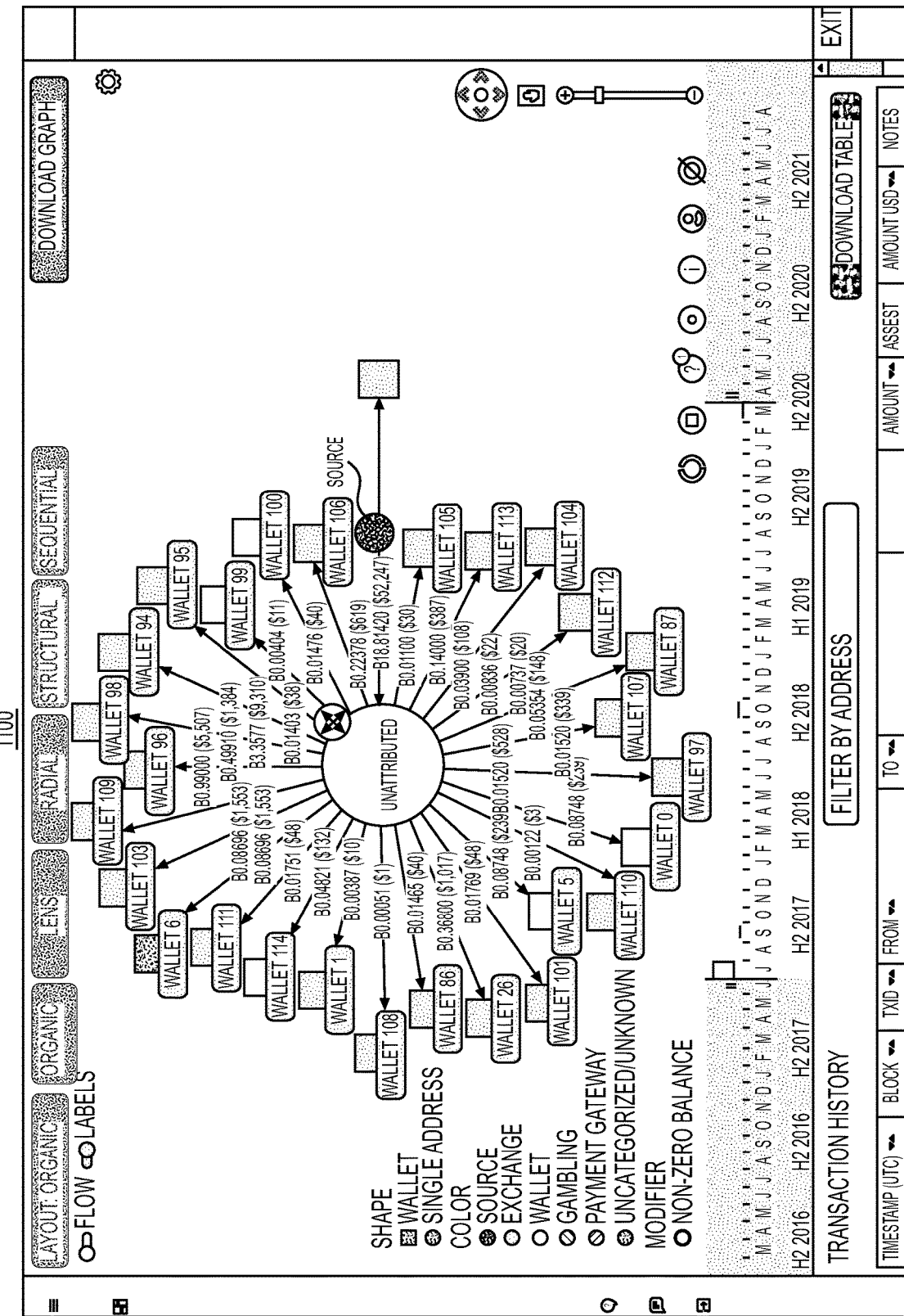
FIGS. 11-14 depict alternative exemplary GUIs wherein the plurality of nodes and edges are arranged and presented on an electronic display in alternate configurations, according to one or more embodiments.
Figure 12:
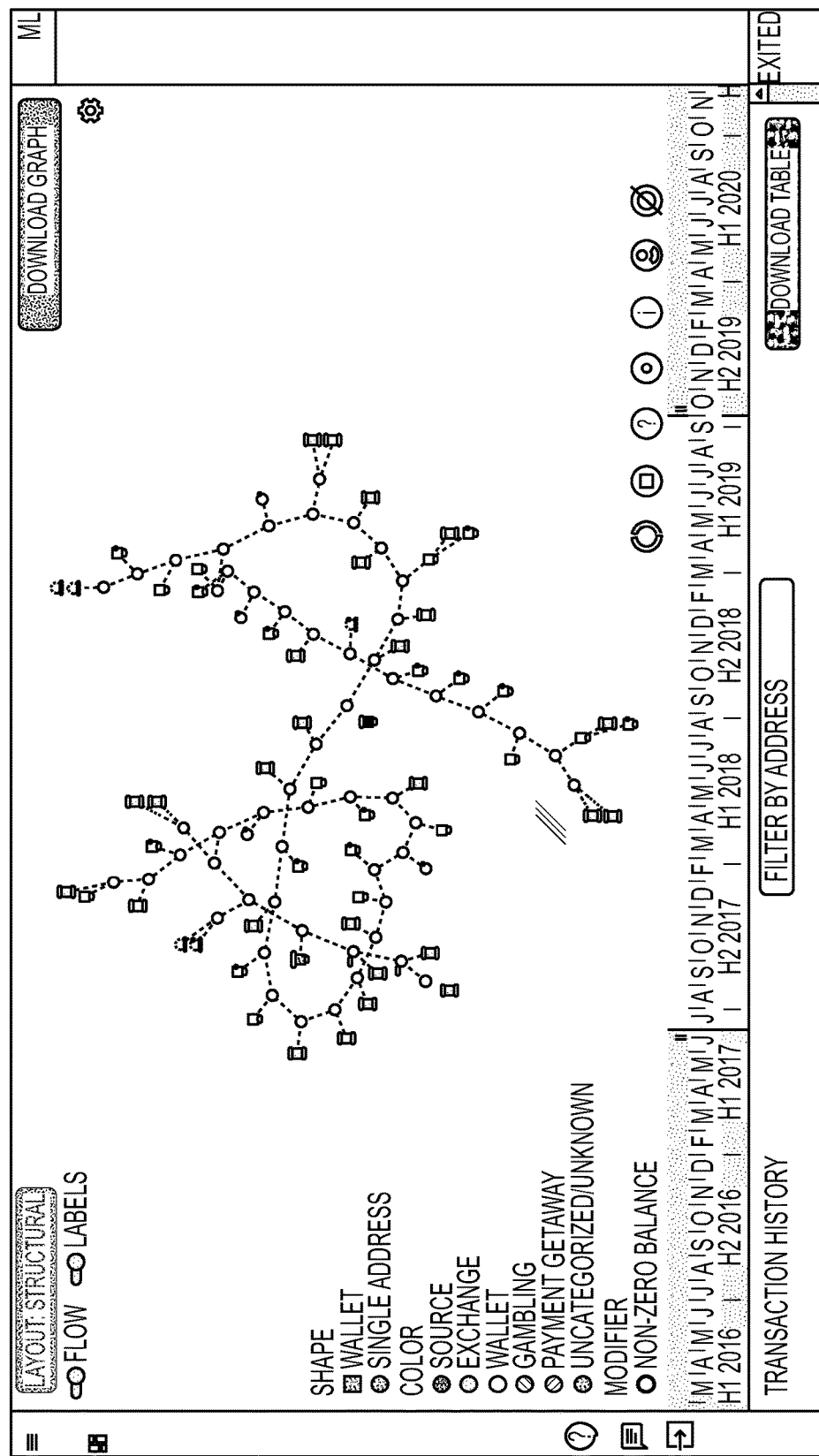
Figure 13:
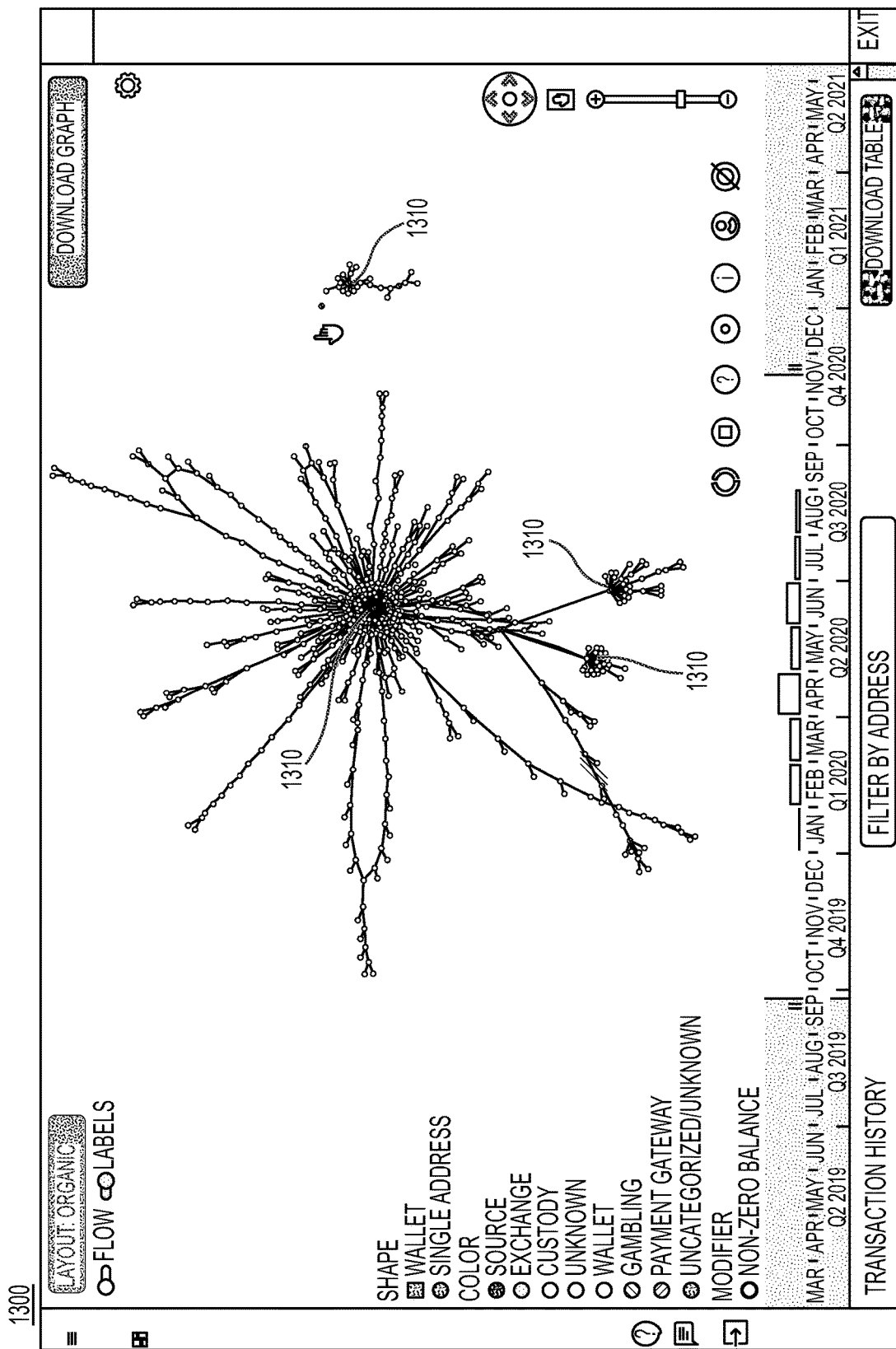
Figure 14:
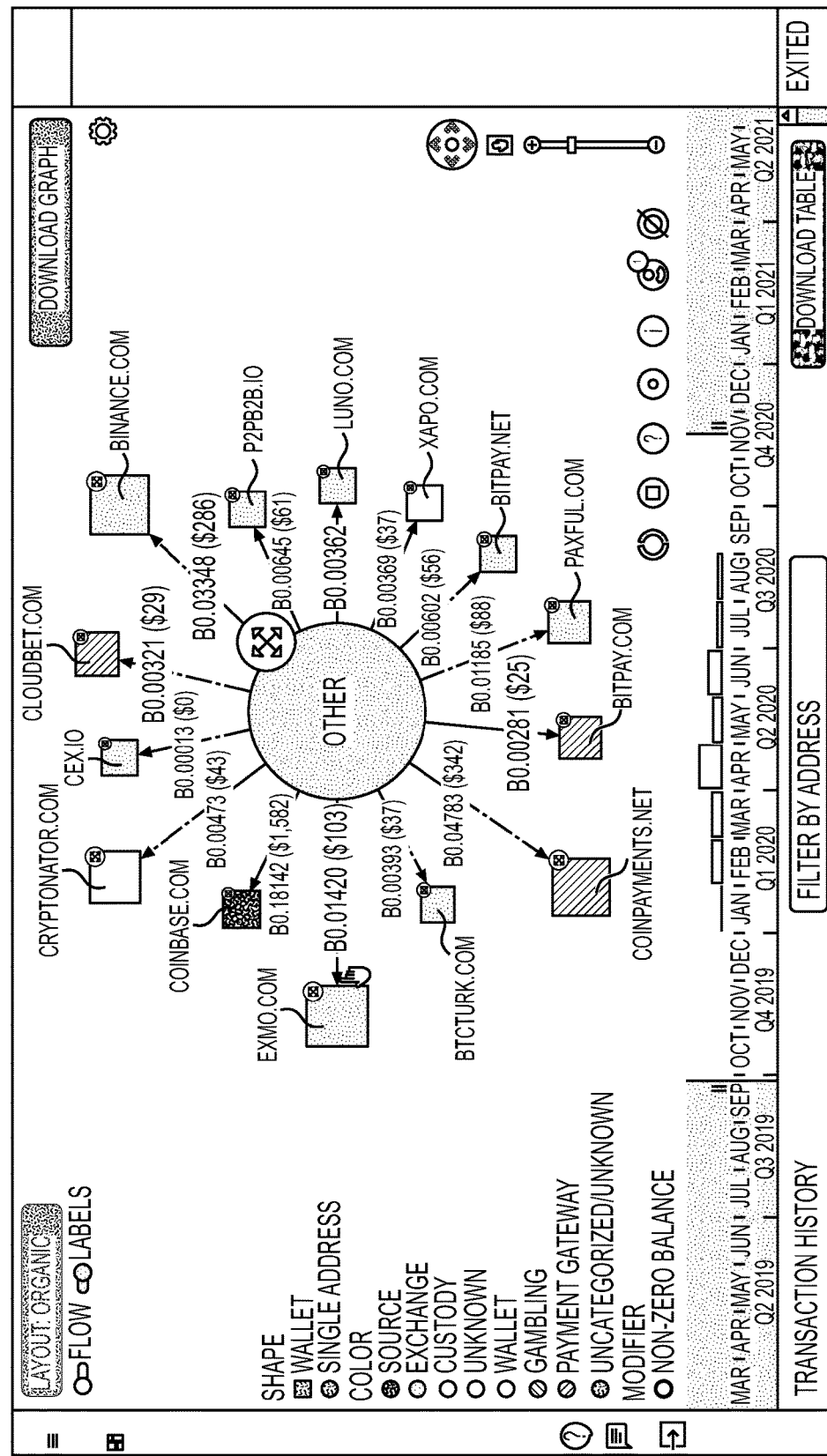

FIGS. 11-14 depicts alternative exemplary GUIs presented on display 120 wherein the plurality of nodes and edges are arranged and presented in alternate structural configurations, according to one or more embodiments. In some embodiments, the layout of the graphical depictions of the GUIs may be customized by a user. For example, by clicking on an icon with labels such as organic, lens, or radial, and so forth that are presented on the GUI, for example on toolbar 620 described above with respect to FIG. 6, the graph data may be presented in a different layout for better user visualization. FIG. 11, for example, provides an organic layout of the nodes and edges of the node data set on the GUI 1100, wherein the relevant nodes are presented radially around a center point instead of sequentially as shown in prior FIGS. 6-10. FIG. 12 provides another possible layout for the nodes and edges simulating a network on exemplary GUI 1200. In another embodiment, groups of nodes may be condensed or reorganized after a report or graph has been generated as explained above. For example, nodes belonging to the same entity may be grouped into a wallet. An example of this is shown in FIGS. 13 and 14. FIGS. 13 and 14 may, for example, depict nodes concerning blockchain transactions on the dark web (unindexed websites which are not searchable through any standard search engine or browser). Source nodes 1310, which are typically in red on the interface, may be nodes belonging to actors that are potentially involved in illicit transactions. However, source nodes which are not connected to the larger group may not be engaged in transactions (or the same transaction as the majority of the red nodes), whereas source nodes in communication with each other and clustered together may suggest at least some connection, as visually depicted on the GUI 1300 in FIG. 13. FIG. 13 further depicts the node data set prior to one or more groups of nodes being condensed before one or more groups of nodes have been condensed (for example, classifying nodes into "wallets" or "grouping by entity") and FIG. 14 depicts a GUI 1400 with the graphical depictions after one or more nodes have been condensed as described above. In some embodiments, multiple different types of blockchain ledger data may be presented within the same report. For example, different nodes corresponding to currencies, medical records, military records, and other types of data may be presented simultaneously. In some embodiments, multiple currencies may be monitored and tracked within a single report or graph. The disclosures herein would be particularly helpful for forensic analysis and users seeking to find information that is hidden within blockchain ledgers.

Figure 15:
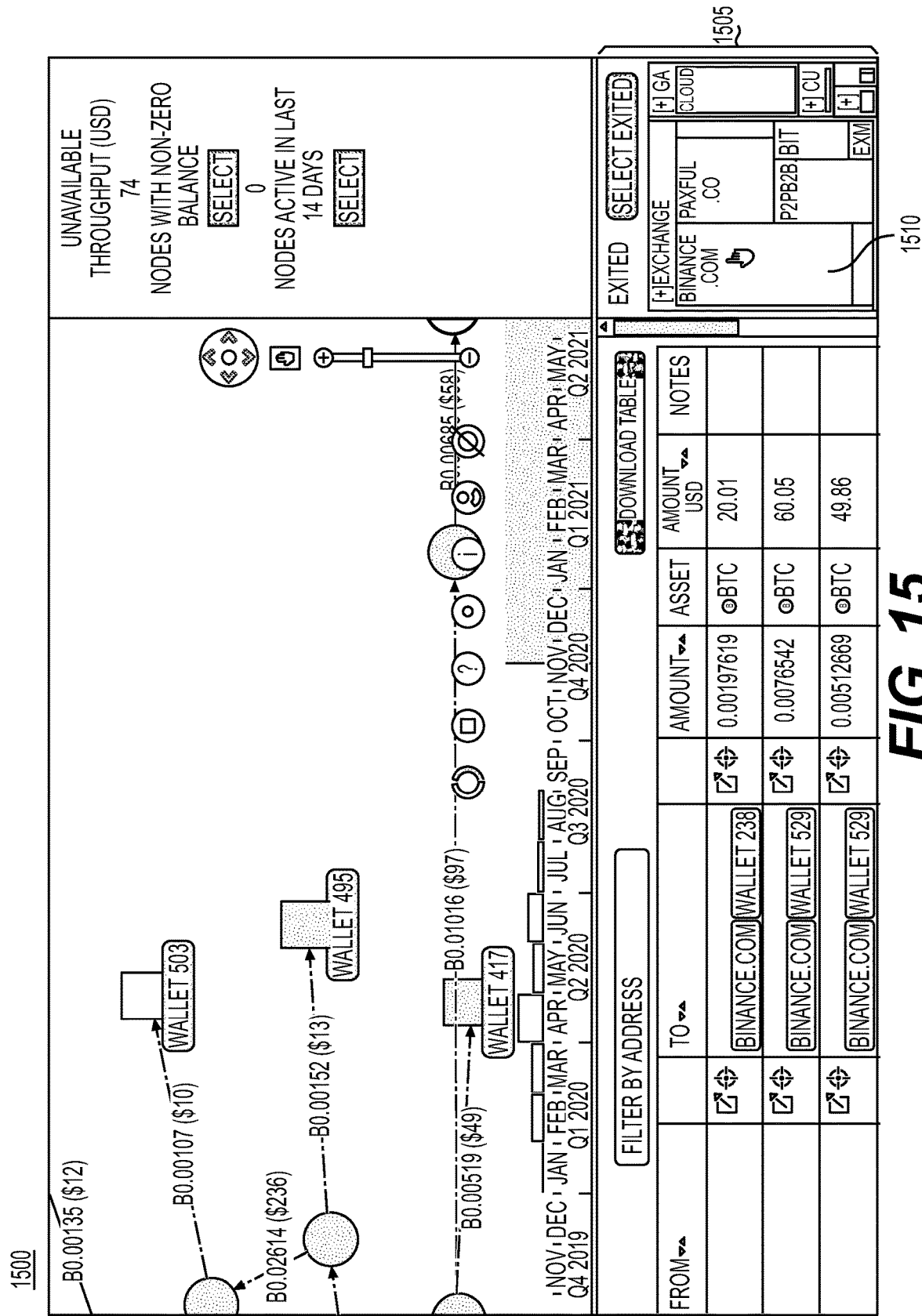
FIG. 15 depicts an exemplary GUI wherein a histogram of a node data set is implemented on a GUI, according to one or more embodiments.

FIG. 15 depicts a GUI 1500 implemented on display 120 that further presents an interactive histogram 1505, according to one or more embodiments. A histogram is typically understood to be a diagram consisting of rectangles whose area is proportional to the frequency of a variable and whose width is equal to the class interval, and is used to summarize discrete or continuous. Based on the node data set, interactive histogram 1505 may be presented containing icons generated based on data associated with the blockchain nodes displayed on the screen in the node data set. For example, as shown in FIG. 15, interactive histogram 1505 may be presented in a bottom right portion of the GUI on display 120 as shown. The interactive histogram 1505 may further be capable of receiving a user input via display 120, for example a touch of mouse click input, on portions of the interactive histogram 1505. As shown in FIG. 15, upon selection of a particular graphical icon or portion of the interactive histogram 1505, for example a portion 1510 corresponding to "binance.com," all nodes associated with binance.com may be highlighted on the GUI 1500 and/or nodes not associated with binance.com may be grayed out or removed from view on the GUI 1500. In other embodiments, selecting portion 1510 may remove corresponding icons from the GUI 1500. The interactive histogram 1505 provides yet another technical improvement for the GUI that allows for better visualization and presentation of blockchain node data on display 120.

In some embodiments, after a graph or report has been generated for a user by controller 130, the controller may automatically send an alert to users via network interface 140 upon determining a change in information, for example new transactional activity, new attribution information, new metadata, and so forth. This alert may be in the form of a text message, electronic mail, push notification to a smart device, a phone call, a notification upon logging in to the app or software, or any other method of transmitting information to a user. In this manner, users can be timely updated in the event of an information change with respect to a previously generated report. This functionality enables easier continuous monitoring of nodes even after a report has been generated.

The methods and systems disclosed herein may further be implemented by controller 130 with a machine learning model. As used herein, a "machine learning model" is a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

The machine learning model may be trained to automatically generate risk values for each node in a blockchain node data set as described above using the method 200 described above with respect to FIG. 2. In some embodiments, the machine learning model may be trained by controller 130 to (i) extract node data and edge data from a node data set, and/or (ii) analyze the node and edge transactions to predict a risk value for each node. In other embodiments, the machine learning model may be trained by controller 130 to (i) receive data associated with user inputs and other information associated with displaying and generating prior reports and/or (2) predict or suggest likely inputs for similar future reports. Accordingly, based on a user's prior interactions and preferences in displaying report information on the GUI, the controller, using machine learning model, may determine the likelihood that a user will have similar inputs or desire a similar visualization scheme for a similar report, and accordingly, automatically implement or suggest visualization preferences for the user. In some embodiments, data relating to user inputs, selections, and visualizations as described above with respect to FIGS. 5-15 may be collected and stored on a database by controller 130 and then transmitted to the machine learning model for analysis. The machine learning model may learn based on a user's prior patterns that the user previously input a 3-hop maximum, 50% dilution, and $10,000 transaction in graph parameters window 720 as shown in FIG. 7, and further used an organic node and edge layout as shown in FIG. 12. The machine learning model may analyze these prior inputs, predict a user's preference, and then controller 130 may implement these preferences for future reports requested by the user. In some embodiments, the machine learning model may receive and analyze information from numerous different users, determine the most popular preferences or inputs based on this data, and then automatically suggest these preferences to a specific user. In this manner, the machine learning model may further improve the functionality, visualization, and convenience of the GUI for the user.

The machine learning model may be a trained machine learning model, such as, for example, a k-nearest neighbor (kNN) and dynamic time warping (DTW) model, or a trained neural network model. The machine learning model may be trained on a dataset of risk values calculated for prior node data sets. A neural network may be software representing the human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include, for example, a convolutional neural network (CNN), a deep neural network, or a recurrent neural network (RNN), such as a long short-term memory (LSTM) recurrent neural network. Any suitable type of neural network may be used.

In some embodiments, a combination of neural network models may be used to detect to determine and predict GUI preferences. For example, a CNN model may be used to collect and extract data associated with user inputs and other information associated with displaying and generating prior reports as described above, and an LSTM recurrent neural network model may be used to predict or suggest inputs and features for the user. In some embodiments, an LSTM recurrent neural network model may be used to extract user inputs and other information associated with displaying and generating prior reports. In other embodiments, a combination of a CNN model and an LSTM recurrent neural network model may be used to collect and extract data relating to user inputs and other information associated with displaying and generating prior reports.

Figure 16:
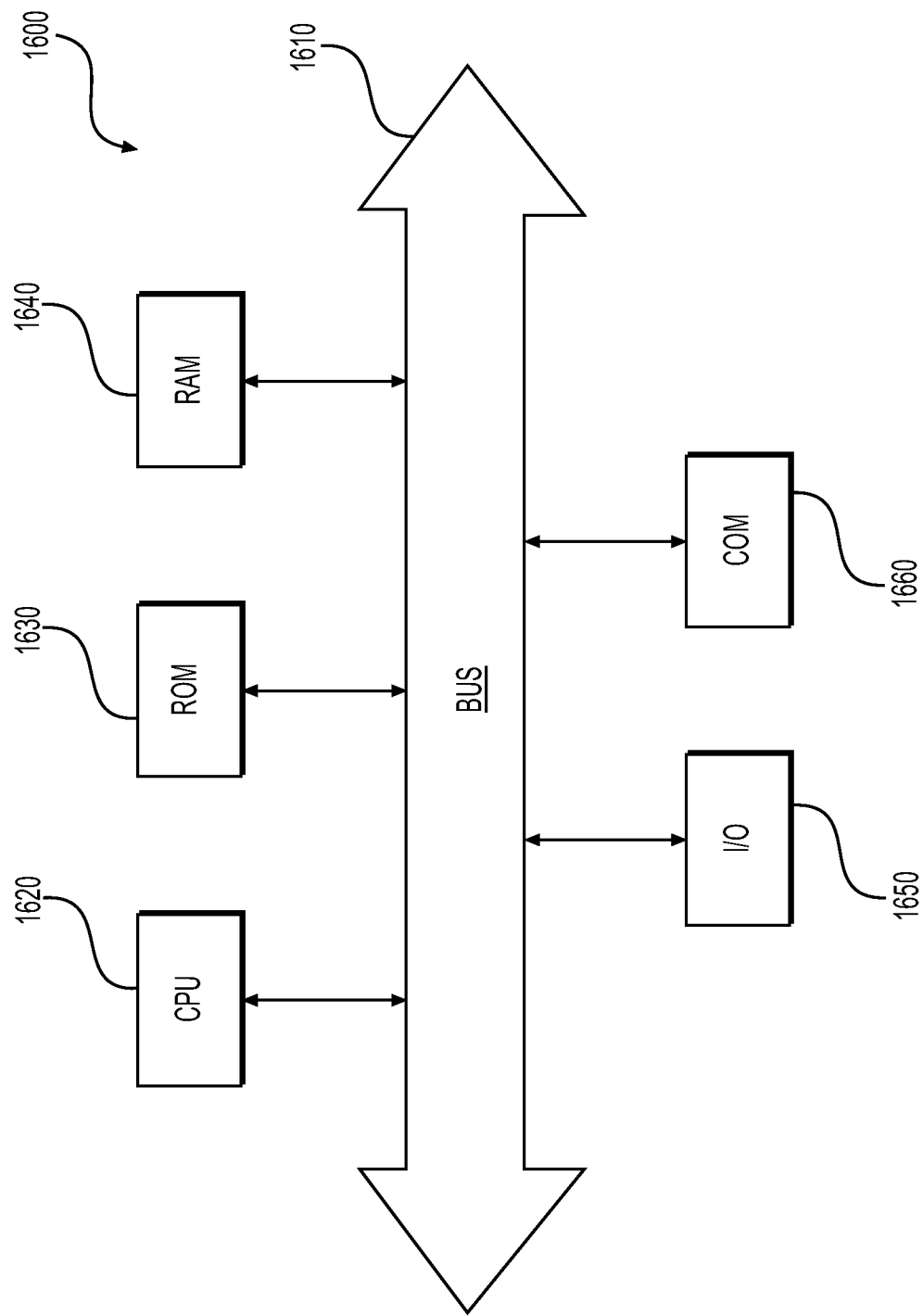
FIG. 16 depicts an example system that may execute techniques presented herein.

FIG. 16 depicts an example system that may execute techniques presented herein. FIG. 16 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1660 for packet data communication. The platform may also include a central processing unit ("CPU") 1620, in the form of one or more processors, for executing program instructions. The platform may include an internal communication bus 1610, and the platform may also include a program storage and/or a data storage for various data files to be processed and/or communicated by the platform such as ROM 1630 and RAM 1640, although the system 1600 may receive programming and data via network communications. The system 1600 also may include input and output ports 1650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a programmed controller or computer. Those skilled in the relevant art will appreciate that aspects of the present disclosure can be practiced with other communications, data processing, or computer system configurations, including: Internet appliances, hand-held devices, etc.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It will be apparent to those skilled in the art that various modifications and variations can be made to the disclosed system without departing from the scope of the disclosure. Other embodiments of the system will be apparent to those skilled in the art from consideration of the specification and practice of the method disclosed herein. It is intended that the specification and examples be considered as exemplary only, with a true scope of the disclosure being indicated by the following claims and their equivalents.

The invention claimed is:

1. A computer-implemented method for quantifying degrees of association between blockchain nodes in a weighted-linked database, the computer-implemented method comprising:
   receiving, by one or more processors, a node data set comprising a plurality of nodes and a plurality of edges;
   using a trained machine learning model to extract node data and edge data from the node data set, wherein the edge data comprises data indicating a source node address, a target node address, and an edge weight, and wherein the trained machine learning model is trained to learn relationships between (i) first data regarding one or more prior nodes and one or more prior edges as test data; and (ii) second data that includes prior risk values corresponding to the one or more prior nodes by:
      identifying flagged nodes among the one or more prior nodes;
      identifying clean nodes among the one or more prior nodes;
      assessing an impact of the flagged nodes and the clean nodes on the prior risk values corresponding to the one or more prior nodes by determining the edge weight of each of the flagged nodes associated with a target node of the one or more prior nodes and the edge weight of each of the clean nodes associated with the target node of the one or more prior nodes; and
      applying one or more of a weight, bias, classification, or analysis on the node data set to extract the node data and the edge data from the node data set; and
   generating, by the one or more processors, a graphical user interface based on the node data and edge data by:
      determining, for each node in the node data set, an initial cumulative vote total value;
      selecting a first node of the plurality of nodes as an input node;
      identifying each edge of the plurality of edges that indicates the source node address corresponding to the input node;
      for each identified edge, identifying a target node;
      modifying the initial cumulative vote total value of each identified target node based on the edge weight of each identified edge;
      generating an updated cumulative vote total value for the target node; and
      upon generating an updated cumulative vote total value for the target node, causing to display, via the graphical user interface, an indicator of the input node, an indicator of each identified edge, and an indicator of the target node.

2. The computer-implemented method of claim 1, wherein generating the graphical user interface based on the node data and edge data further comprises:
   upon generating the indicator of the input node, the indicator of each identified edge, the indicator of the target node, and the indicator of the updated cumulative vote total value for the target node, identifying each additional edge of the plurality of edges that indicates the source node address corresponding to the target node;
   for each identified additional edge indicating the source node address corresponding to the target node, identifying a second target node;
   generating an updated cumulative vote total value for the second target node, wherein the updated cumulative vote total value for the second target node is generated by modifying an initial cumulative vote total value of each second target node based on the edge weight of each identified additional edge; and
   upon generating the updated cumulative vote total value for the second target node, causing to display, via the graphical user interface, an indicator of the second target node and an indicator of each identified additional edge.

3. The computer-implemented method of claim 1, wherein generating the graphical user interface based on the node data and edge data further comprises:
   determining a total amount received value for the target node, wherein a risk value for the target node is further generated based on the total amount received value for the target node and the updated cumulative vote total value for the target node.

4. The computer-implemented method of claim 2, further comprising updating the graphical user interface to display an indicator of the updated cumulative vote total value for the second target node.

5. The computer-implemented method of claim 1, wherein the edge weight corresponding to each edge is associated with a transaction amount.

6. The computer-implemented method of claim 1, wherein each node of the plurality of nodes comprises one or more cryptocurrency addresses.

7. The computer-implemented method of claim 1, wherein each edge of the plurality of edges corresponds to a financial transaction, and further wherein the edge weight is predetermined based on a transaction amount associated with the financial transaction.

8. The computer-implemented method of claim 1, further comprising:
associating, by the one or more processors, the first node with a first activity, wherein the first activity is one or more of fraudulent activity, illicit activity, or illegal activity.

9. The computer-implemented method of claim 1, wherein generating the graphical user interface based on the node data and the edge data further comprises:
presenting, via the graphical user interface, a window including a minimum dilution input element and a maximum hops input element, wherein the graphical user interface is configured to accept a user input;
determining a dilution value for the target node based on a transaction amount associated with each identified edge indicating the source node address corresponding to the target node;
receiving, via the graphical user interface, an input from a user indicating a minimum dilution value threshold;
determining whether the dilution value for the target node exceeds the minimum dilution value threshold; and
upon determining that the dilution value for the target node does not exceed the minimum dilution value threshold, updating the graphical user interface to remove the indicator of the target node.

10. A system for quantifying degrees of association between blockchain nodes in a weighted-linked database, the system comprising:
at least one data storage device storing processor-readable instructions stored therein; and
at least one processor configured to execute the processor-readable instructions stored in the at least one data storage device to perform operations comprising:
receiving a node data set comprising a plurality of nodes and a plurality of edges;
using a trained machine learning model to extract node data and edge data from the node data set, wherein the edge data comprises data indicating a source node address, a target node address, and an edge weight, and wherein the trained machine learning model is trained to learn relationships between (i) first data regarding one or more prior nodes and one or more prior edges as test data; and (ii) second data that includes prior risk values corresponding to the one or more prior nodes by:
identifying flagged nodes among the one or more prior nodes;
identifying clean nodes among the one or more prior nodes;
assessing an impact of the flagged nodes and the clean nodes on the prior risk values corresponding to the one or more prior nodes by determining the edge weight of each of the flagged nodes associated with a target node of the one or more prior nodes and the edge weight of each of the clean nodes associated with the target node of the one or more prior nodes; and
applying one or more of a weight, bias, classification, or analysis on the node data set to extract the node data and the edge data from the node data set; and
generating a graphical user interface based on the node data and edge data by:
determining, for each node in the node data set, an initial cumulative vote total value;
selecting a first node of the plurality of nodes as an input node;
identifying each edge of the plurality of edges that indicates the source node address corresponding to the input node;
for each identified edge, identifying a target node;
modifying the initial cumulative vote total value of each identified target node based on the edge weight of each identified edge;
generating an updated cumulative vote total value for the target node; and
upon generating an updated cumulative vote total value for the target node, causing to display, via the graphical user interface, an indicator of the input node, an indicator of each identified edge, and an indicator of the target node.

11. The system of claim 10, wherein generating the graphical user interface based on the node data and edge data further comprises:
upon generating the indicator of the input node, the indicator of each identified edge, the indicator of the target node, and the indicator of the updated cumulative vote total value for the target node, identifying each additional edge of the plurality of edges that indicates the source node address corresponding to the target node;
for each identified additional edge indicating the source node address corresponding to the target node, identifying a second target node;
generating an updated cumulative vote total value for the second target node, wherein the updated cumulative vote total value for the second target node is generated by modifying an initial cumulative vote total value of each second target node based on the edge weight of each identified additional edge; and
upon generating the updated cumulative vote total value for the second target node, causing to display, via the graphical user interface, an indicator of the second target node and an indicator of each identified additional edge.

12. The system of claim 10, wherein generating the graphical user interface based on the node data and edge data further comprises:
determining a total amount received value for the target node, wherein a risk value for the target node is further generated based on the total amount received value for the target node and the updated cumulative vote total value for the target node.

13. The system of claim 11, wherein generating the graphical user interface based on the node data and edge data further comprises updating the graphical user interface to display an indicator of the updated cumulative vote total value for the second target node.

14. The system of claim 10, wherein the edge weight corresponding to each edge is associated with a transaction amount.

15. The system of claim 10, wherein each node of the plurality of nodes comprises one or more cryptocurrency addresses.

16. The system of claim 10, wherein each edge of the plurality of edges corresponds to a financial transaction, and further wherein the edge weight is predetermined based on a transaction amount associated with the financial transaction.

17. The system of claim 10, the operations further comprising:

associating the first node with a first activity, wherein the first activity is one or more of fraudulent activity, illicit activity, or illegal activity.

18. The system of claim 10, wherein generating the graphical user interface based on the node data and edge data further comprises:
   causing to present, via the graphical user interface, a window including a minimum dilution input element and a maximum hops input element, wherein the graphical user interface is configured to accept a user input;
   determining a dilution value for the target node based on a transaction amount associated with each identified edge indicating the source node address corresponding to the target node;
   receiving, via the graphical user interface, a user input indicating a minimum dilution value threshold;
   determining whether the dilution value for the target node exceeds the minimum dilution value threshold; and
   upon determining that the dilution value for the target node does not exceed the minimum dilution value threshold, updating the graphical user interface to remove the indicator of the target node and the updated cumulative vote total value for the target node.

19. The system of claim 10, wherein the initial cumulative vote total value is set equal to zero.

20. A computer-implemented method for quantifying degrees of association between blockchain nodes in a weighted-linked database, the computer-implemented method comprising:
   receiving, by one or more processors, a node data set comprising a plurality of nodes and a plurality of edges;
   using a trained machine learning model to extract node data and edge data from the node data set, wherein the edge data comprises data indicating a source node address, a target node address, and an edge weight, and wherein the trained machine learning model is trained to learn relationships between (i) first data regarding one or more prior nodes and one or more prior edges as test data; and (ii) second data that includes prior risk values corresponding to the one or more prior nodes by:
      identifying flagged nodes among the one or more prior nodes;
      identifying clean nodes among the one or more prior nodes;
      assessing an impact of the flagged nodes and the clean nodes on the prior risk values corresponding to the one or more prior nodes by determining the edge weight of each of the flagged nodes associated with a target node of the one or more prior nodes and the edge weight of each of the clean nodes associated with the target node of the one or more prior nodes; and
      applying one or more of a weight, bias, classification, or analysis on the node data set to extract the node data and the edge data from the node data set;
   determining, by the one or more processors, for each node in the node data set, an initial cumulative vote total value;
   selecting, by the one or more processors, a first node of the plurality of nodes as an input node;
   identifying, by the one or more processors, each edge of the plurality of edges that indicates the source node address corresponding to the input node;
   for each identified edge, identifying, by the one or more processors, a target node;
   modifying, by the one or more processors, the initial cumulative vote total value of each identified target node based on the edge weight of each identified edge;
   generating an updated cumulative vote total value for the target node;
   causing to display, by the one or more processors, via a graphical user interface:
      an indicator of the input node;
      an indicator of each identified edge;
      an indicator of the target node; and
      a window including a minimum dilution input element and a maximum hops input element, wherein the graphical user interface is configured to accept a user input;
   determining a dilution value for the target node based on a transaction amount associated with each identified edge indicating a source node address corresponding to the target node;
   receiving, via the graphical user interface, an input from a user indicating a minimum dilution value threshold;
   determining whether the dilution value for the target node exceeds the minimum dilution value threshold; and
   upon determining that the dilution value for the target node does not exceed the minimum dilution value threshold, updating the graphical user interface to remove the indicator of the target node.

* * * * *